US010255641B1

(12) United States Patent
Goldman et al.

(10) Patent No.: US 10,255,641 B1
(45) Date of Patent: Apr. 9, 2019

(54) PREDICTIVE MODEL BASED IDENTIFICATION OF POTENTIAL ERRORS IN ELECTRONIC TAX RETURN

(71) Applicant: Intuit Inc., Mountain View, CA (US)

(72) Inventors: Jonathan Goldman, Mountain View, CA (US); Massimo Mascaro, San Diego, CA (US); William T. Laaser, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 818 days.

(21) Appl. No.: 14/530,369

(22) Filed: Oct. 31, 2014

(51) Int. Cl.
  *G06Q 40/00* (2012.01)
(52) U.S. Cl.
  CPC .................. *G06Q 40/123* (2013.12)
(58) Field of Classification Search
  CPC .............................. G06Q 40/00; G06Q 40/123
  USPC ........................................................... 705/31
  See application file for complete search history.

(56) References Cited

U.S. PATENT DOCUMENTS

| | | | |
|---|---|---|---|
| 5,500,920 A | 3/1996 | Kupiec | |
| 5,884,283 A | 3/1999 | Manos | |
| 6,021,397 A | 2/2000 | Jones et al. | |
| 6,311,166 B1 | 10/2001 | Nado et al. | |
| 7,047,251 B2 * | 5/2006 | Reed | G06Q 30/02 |
| 7,149,970 B1 | 12/2006 | Pratley et al. | |
| 7,254,554 B2 | 8/2007 | Tawara et al. | |
| 7,289,956 B2 | 10/2007 | Yu et al. | |
| 7,539,635 B1 | 5/2009 | Peak et al. | |
| 7,584,093 B2 | 9/2009 | Potter et al. | |
| 7,685,082 B1 | 3/2010 | Coletta et al. | |
| 7,742,958 B1 | 6/2010 | Leek et al. | |
| 7,890,442 B2 | 2/2011 | Weir et al. | |
| 7,984,004 B2 | 7/2011 | Andrew et al. | |

(Continued)

FOREIGN PATENT DOCUMENTS

KR   10-2013-0027811   3/2013

OTHER PUBLICATIONS

PCT International Search Report for PCT/US2014/056516, Applicant: Intuit Inc., Form PCT/ISA/210 and 220, dated Jun. 18, 2015 (5pages).

(Continued)

*Primary Examiner* — Robert R Niquette
*Assistant Examiner* — Liz P Nguyen
(74) *Attorney, Agent, or Firm* — DLA Piper LLP US

(57) ABSTRACT

Computer-implemented methods, articles of manufacture and computerized systems for identifying or alerting a user of certain data in electronic tax returns. A computerized tax return preparation system including a tax return preparation software application executed by a computing device receives first and second tax data and populates respective fields of the electronic tax return. The system executes a predictive model such as logistic regression, naive bayes, K-means clustering, clustering, k-nearest neighbor, and neural networks. First tax data is an input into the predictive model, which generates an output, which is compared with second tax data. An alert is generated when the second tax data does not satisfy pre-determined criteria relative to the first output generated by the predictive model. The same or other predictive model may be used as additional tax data is received for subsequent tax data analysis.

35 Claims, 28 Drawing Sheets

(56) References Cited

U.S. PATENT DOCUMENTS

| | | | |
|---|---|---|---|
| 8,126,787 B1 | 2/2012 | Leek et al. | |
| 8,190,499 B1 | 5/2012 | McVickar | |
| 8,346,635 B1* | 1/2013 | Olim | G06Q 40/12 705/30 |
| 8,527,375 B1 | 9/2013 | Olim | |
| 8,635,127 B1 | 1/2014 | Shaw | |
| 2002/0111888 A1 | 8/2002 | Stanley et al. | |
| 2003/0069882 A1 | 4/2003 | Nieswand et al. | |
| 2004/0102971 A1 | 5/2004 | Lipscher et al. | |
| 2005/0038722 A1 | 2/2005 | Throndson et al. | |
| 2005/0043998 A1 | 2/2005 | Bross et al. | |
| 2005/0278221 A1 | 12/2005 | Hahn-Carlson et al. | |
| 2005/0289023 A1 | 12/2005 | Hahn-Carlson et al. | |
| 2005/0289024 A1 | 12/2005 | Hahn-Carlson et al. | |
| 2006/0122918 A1 | 6/2006 | Graboske et al. | |
| 2006/0206454 A1 | 9/2006 | Forstall et al. | |
| 2007/0033116 A1 | 2/2007 | Murray | |
| 2007/0136115 A1 | 6/2007 | Senturk et al. | |
| 2008/0065617 A1 | 3/2008 | Burke et al. | |
| 2009/0234684 A1 | 9/2009 | Stoke et al. | |
| 2010/0017348 A1 | 1/2010 | Pinckney et al. | |
| 2011/0258195 A1 | 10/2011 | Welling et al. | |
| 2012/0030159 A1 | 2/2012 | Pilaszy et al. | |
| 2012/0084185 A1 | 4/2012 | Ciaramitaro et al. | |
| 2012/0109792 A1 | 5/2012 | Eftekhari et al. | |
| 2013/0198047 A1 | 8/2013 | Houseworth et al. | |
| 2013/0282539 A1 | 10/2013 | Murray | |
| 2014/0337189 A1 | 11/2014 | Barsade et al. | |
| 2015/0379631 A1* | 12/2015 | Singh | G06Q 40/00 705/38 |

OTHER PUBLICATIONS

PCT Written Opinion of the International Search Authority for PCT/US2014/056516, Applicant: Intuit Inc., Form PCT/ISA/237, dated Jun. 18, 2015 (9pages).
Final Office Action dated Sep. 10, 2014 in U.S. Appl. No. 12/475,767, filed Jun. 1, 2009 (25 pages).
Amendment filed Jun. 27, 2014 in U.S. Appl. No. 12/475,767, filed Jun. 1, 2009 (10 pages).
Office Action dated Mar. 27, 2014 in U.S. Appl. No. 12/475,767, filed Jun. 1, 2009 (24 pages).
Amendment filed Jan. 25, 2012 in U.S. Appl. No. 12/475,767, filed Jun. 1, 2009 (10 pages).
Final Office Action dated Oct. 25, 2011 in U.S. Appl. No. 12/475,767, filed Jun. 1, 2009 (17 pages).
Amendment filed Aug. 11, 2011 in U.S. Appl. No. 12/475,767, filed Jun. 1, 2009 (10 pages).
Office Action dated May 11, 2011 in U.S. Appl. No. 12/475,767, filed Jun. 1, 2009 (15 pages).
Notice of Allowance dated Nov. 18, 2009 in U.S. Appl. No. 11/413,308, filed Apr. 28, 2006 (7 pages).
Amendment filed Sep. 29, 2009 in U.S. Appl. No. 11/413,308, filed Apr. 28, 2006 (12 pages).
Final Office Action dated Jul. 6, 2009 in U.S. Appl. No. 11/413,308, filed Apr. 28, 2006 (16 pages).
Amendment filed Mar. 11, 2009 in U.S. Appl. No. 11/413,308, filed Apr. 28, 2006 (14 pages).
Office Action dated Dec. 19, 2008 in U.S. Appl. No. 11/413,308, filed Apr. 28, 2006 (15 pages).
Notice of Allowance dated Aug. 23, 2012 in U.S. Appl. No. 12/828,012, filed Jun. 30, 2010, (9 pages).
Amendment filed Jun. 11, 2012 in U.S. Appl. No. 12/828,012, filed Jun. 30, 2010, (13 pages).
Interview Summary dated May 25, 2012 in U.S. Appl. No. 12/828,012, filed Jun. 30, 2010, (3 pages).
Office Action dated Mar. 6, 2012 in U.S. Appl. No. 12/828,012, filed Jun. 30, 2010, (23 pages).
Notice of Allowance dated Apr. 19, 2013 in U.S. Appl. No. 13/730,506, filed Dec. 28, 2012, (9 pages).
http://www.gartner.com/it-glossary/predictive-modeling, printed Oct. 27, 2014 (1 page).
http://en.wikipedia.org/wiki/Predictive_modelling, printed Oct. 27, 2014 (8 pages).
http://en.wikipedia.org/wiki/Predictive_analytics, printed Oct. 27, 2014 (18 pages).
http://en.wikipedia.org/wiki/Naive_Bayes_classifier, printed Oct. 27, 2014 (14 pages).
http://en.wikipedia.org/wiki/K-nearest_neighbors_algorithm, printed Oct. 27, 2014 (10 pages).
http://en.wikipedia.org/wiki/Artificial_neural_network, printed Oct. 27, 2014 (22 pages).
http://en.wikipedia.org/wiki/Logistic_regression, printed Oct. 27, 2014 (28 pages).
http://en.wikipedia.org/wiki/Random_forest, printed Oct. 27, 2014 (7 pages).
http://en.wikipedia.org/wiki/Gradient_boosting, printed Oct. 27, 2014 (8 pages).
http://en.wikipedia.org/wiki/K-d_tree, printed Oct. 27, 2014 (10 pages).
http://en.wikipedia.org/wiki/Support_vector_machine, printed Oct. 27, 2014 (16 pages).
http://en.wikipedia.org/wiki/Generalized_linear_model, printed Oct. 27, 2014 (13 pages).
http://www.ibm.com/developerworks/library/ba-predictive-analytics2/, printed Oct. 27, 2014 (8 pages).

* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 9A

| | A | B | C | D | E | F | G | Goal |
|---|---|---|---|---|---|---|---|---|
| R1 | Y | ? | N | ? | ? | ? | ? | Yes |
| R2 | Y | Y | Y | ? | Y | ? | Y | Yes |
| R3 | N | Y | ? | N | N | N | Y | Yes |
| R4 | N | N | ? | ? | ? | N | ? | Yes |
| R5 | N | N | ? | N | ? | ? | ? | Yes |

460

Columns (Questions 462)

(Rows) (Rules 461)

Cross Out Since Answer to Question A is "yes" 1010

FIG. 10

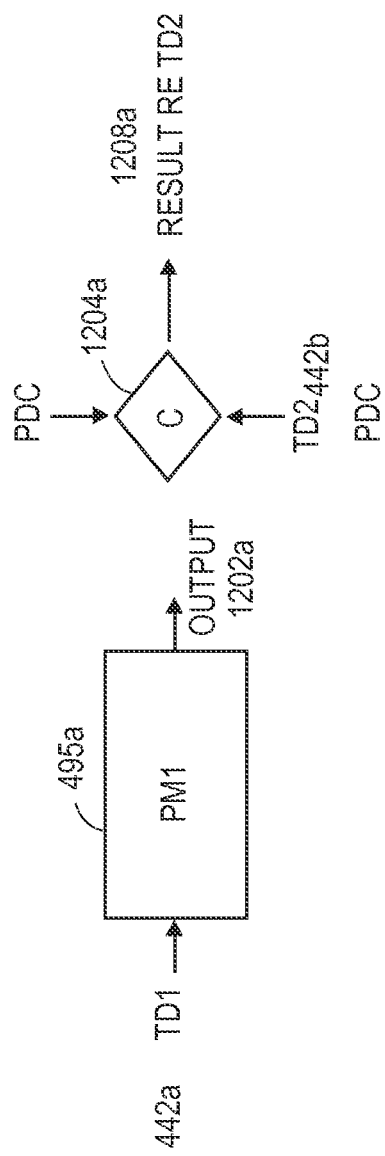
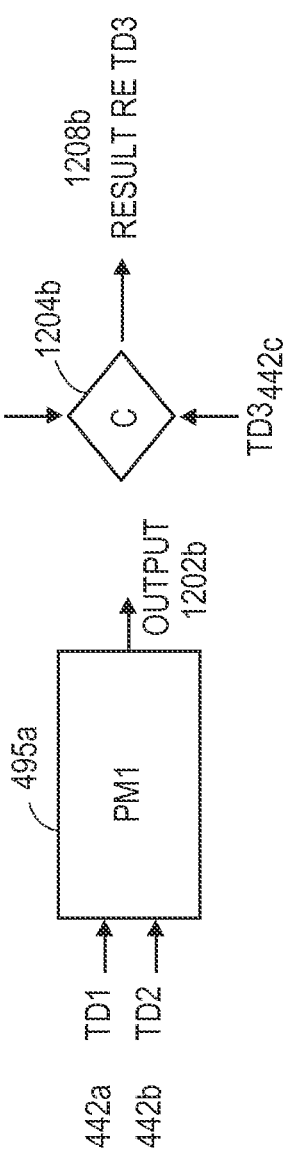
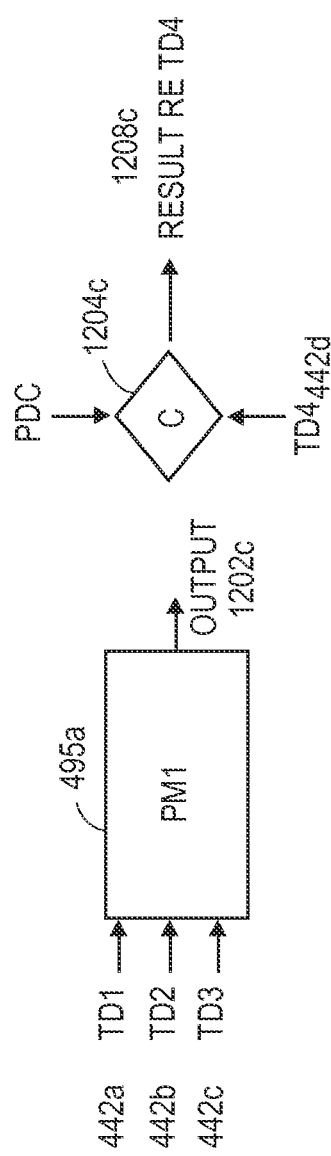
FIG. 17A
FIG. 17B
FIG. 17C

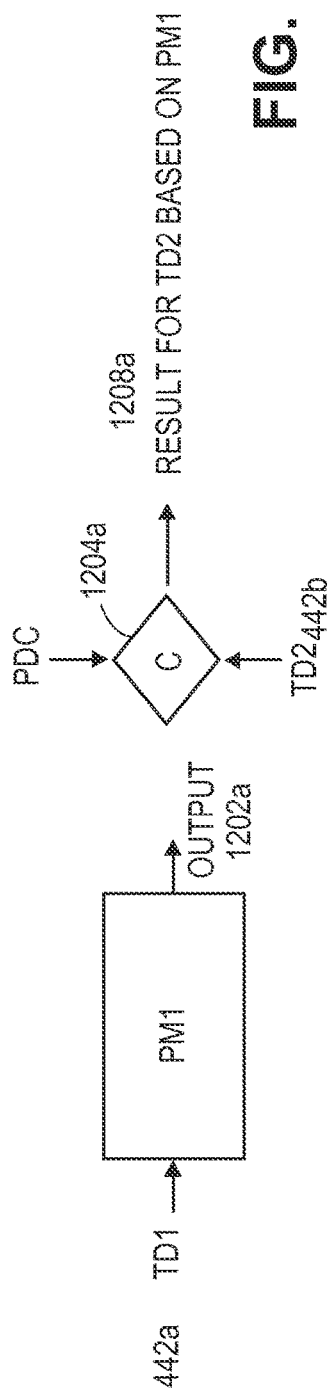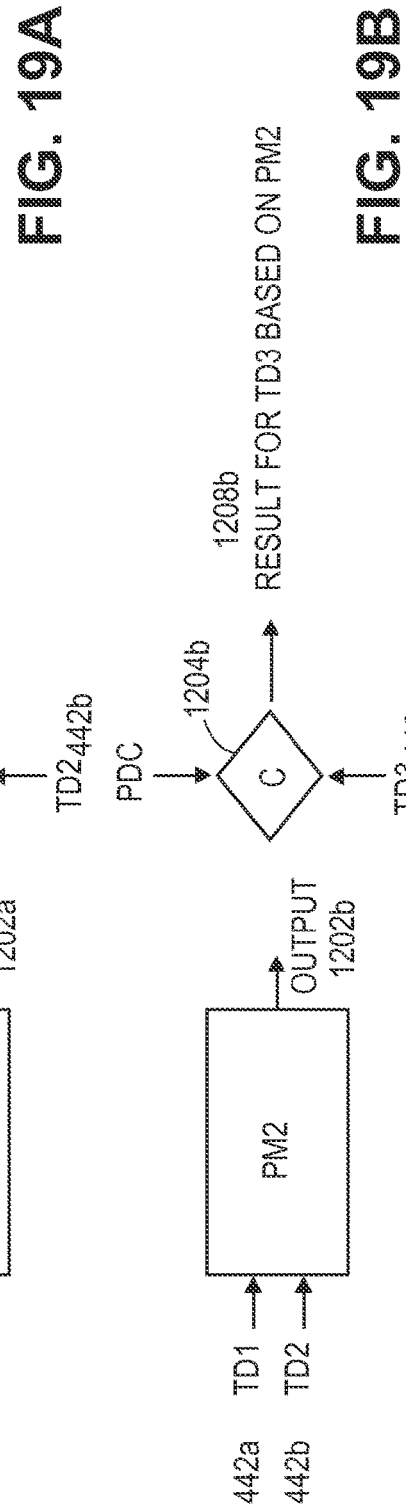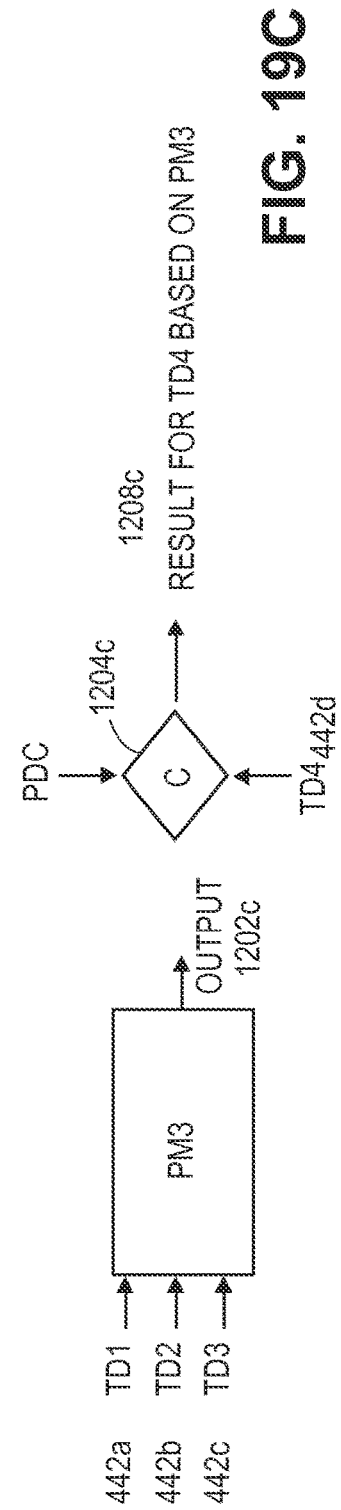
FIG. 19A
FIG. 19B
FIG. 19C

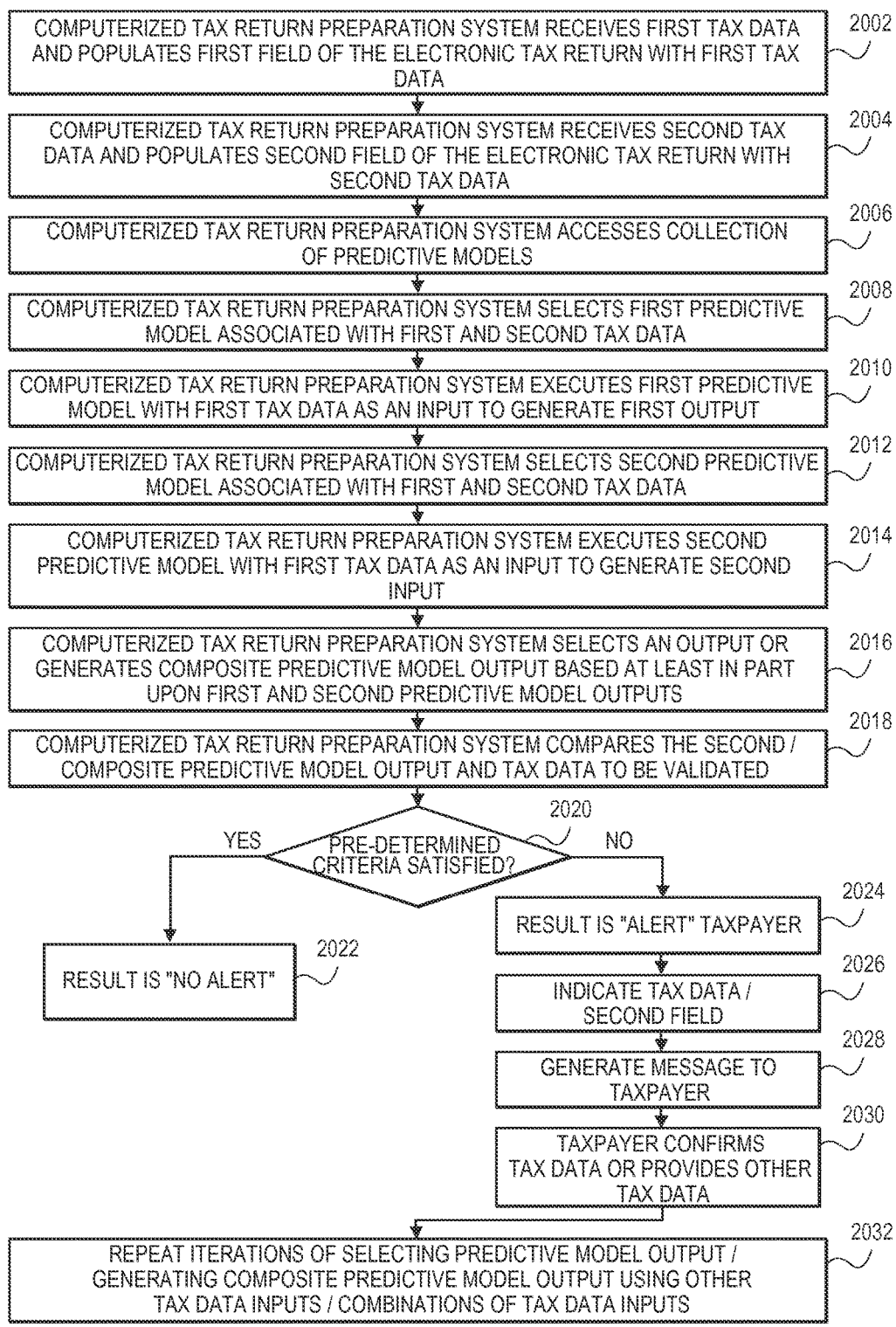

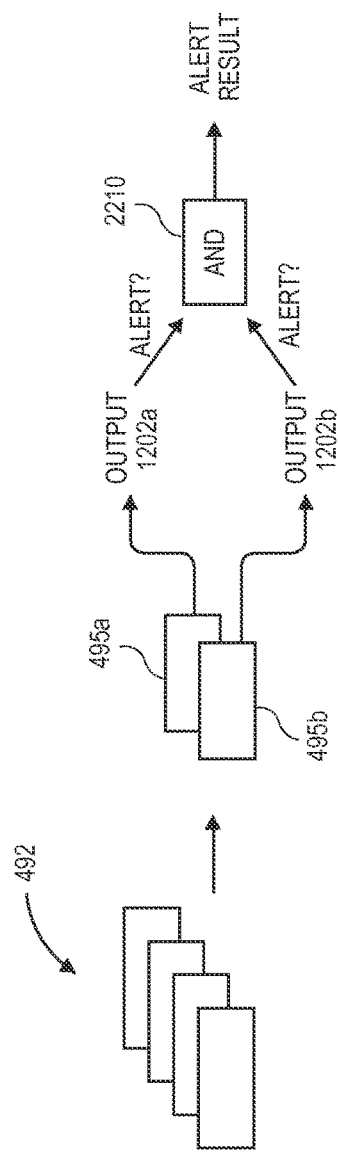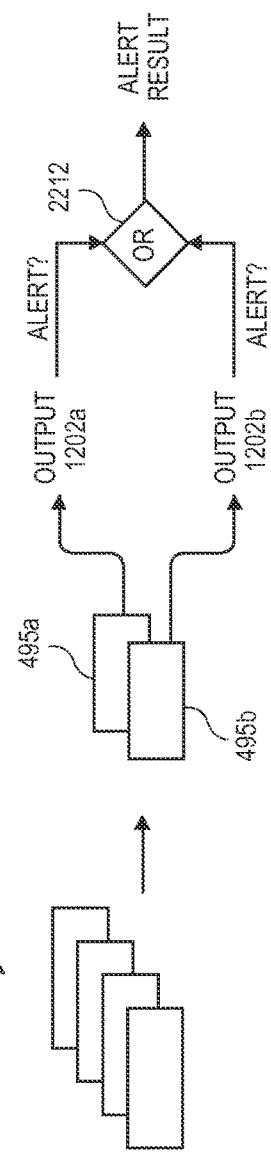
FIG. 21A
FIG. 21B

PREDICTIVE MODEL BASED IDENTIFICATION OF POTENTIAL ERRORS IN ELECTRONIC TAX RETURN

SUMMARY

Embodiments involve identifying or checking for possible and/or actual errors within an electronic tax return. Certain embodiments involve use of predictive models to identify possible errors within an electronic tax return. Other embodiments involve use of tax authority requirements and constraints thereof that are expressed in a declarative manner and checking for actual errors relative to declarative constraints. Certain other embodiments involve use of both predictive models and declarative constraints. Such embodiments may perform prediction model based error check and declarative constraint based error check simultaneously or at different times, thus providing multiple types of error checks. Error checks may be based on or involve the same tax return data, and declarative constraint embodiments may be used to check entered and/or predicted electronic tax return data.

Certain embodiments relate to computerized and automated methods, systems and computer program products for predicting electronic tax return data and checking or verifying electronic tax return data of an electronic tax return during preparation of the electronic tax return.

Certain embodiments involve executing one or more predictive models that generate outputs utilized in connection with notifying a user of a tax return preparation application about electronic tax return data during preparation of an electronic tax return.

Certain embodiments involve executing a predictive model that determines an estimate or prediction of certain tax return data, which may be used to verify tax data within a field of an electronic tax return and identify possible data errors in the electronic tax return. In the event that a possible data error is identified, an alert can be generated for the user, and the user may review the data and confirm or change the identified data in response to the alert.

A predictive model may be triggered to execute in response to different criteria. For example, a predictive model may be triggered to execute when a field is populated with tax data for verifying that tax data within that particular field. A predictive model may also be triggered to execute multiple times to analyze tax data within a particular field multiple times, for example, as additional tax data that is utilized as inputs is received and the predictive model applicable to that tax data being verified is iteratively executed with different sets of input data. In other embodiments, tax data within a particular field is analyzed by executing multiple predictive models. With iterative predictive model execution, and execution of multiple predictive models (one or more of which may also be iteratively executed with different input data), the predictive model(s) executed may result in a different output used for verification. Thus, tax data predication may occur before, in response to, and after a field has been populated with tax data, and tax data verification and alert generation may occur before, in response to and after a field has been populated. Further, a predictive model may be executed for one or multiple types of data or fields. For example, one predictive model may receive inputs and generate an output for verifying only wage data, whereas another predictive model may receive inputs and generate and multi-variable output that includes data for verifying wage data in a first field, property tax data in a second field, and interest deduction data in a third field.

In certain embodiments, tax data that was previously verified such that no alert for that tax data was initially triggered, may be subsequently analyzed as a result of subsequent execution of the same predictive model using a different input data set or other predictive model, and an alert is generated for previously verified data. Further, an alert that was generated for tax data may be subsequently retracted before that tax data is confirmed by the user or the user provides other data. Thus, the output generated by the predictive model can result in an alert being generated for tax data that was previously verified, or retraction of an alert before user input correcting or confirming tax data.

In certain embodiments, tax data that was previously verified such that no alert for that tax data was initially or previously triggered, may be subsequently analyzed as a result of subsequent execution of the same predictive model using a different input data set. Or, the output generated by the predictive model may result in retraction of a prior alert since tax data that was not verified is now verified as a result of subsequent execution of a predictive model.

Embodiments may also involve generation of a composite output from multiple predictive model outputs, and the composite output is used for tax data validation or verification and to determine whether an alert should be generated.

Certain embodiments involve executing a predictive model to determine which types of data are necessary or which sections of the electronic tax return may have to be completed or populated with data.

Certain embodiments involve a predictive model which may be, for example, logistic regression, naive bayes, K-means clustering, clustering, k-nearest neighbor, and neural networks during preparation of an electronic tax return. Thus, embodiments that execute predictive models are different than other systems that may utilized statistical data but that do not execute predictive models.

Certain embodiments are related to executing a predictive model utilizing data of an electronic tax such that data from one or more fields of the electronic tax return is used as inputs into the predictive model, and the output generated by executing the predictive model is used for verifying tax data in another field of the electronic tax return. Data that is used as an input to the predictive model may be data of the current electronic tax return being prepared or data of a prior year electronic tax return. Other embodiments involve using data from a source other than the electronic tax return being prepared, or a combination of data of the electronic tax return and data from a source other than the electronic tax return. In certain embodiments, external source data is utilized for initial or preliminary predictive model executions. Subsequent predictive model executions may involve input data of the electronic tax return for verifying other data of the electronic tax return.

Certain embodiments are directed to checking for actual errors or mistakes relative to declarative expressions of constraints of tax law requirements.

Certain embodiments are directed to declarative constraint based checks of electronic tax return data using tax knowledge or logic that is separated from the interview process or, in other words, using tax law requirements that are expressed in a declarative format or in accordance with declarative programming. According to embodiments, the tax logic or analysis is not programmed within an interview screen.

Certain embodiments involve checking for actual electronic tax return data errors by reading declarative constraints from data structures structured in a declarative manner, which may involve data or based at least in part upon a completion graph or a tax calculation graph, which are separate or independent of interview screens generated by a user interface controller, or declarative constraints stored in a separate library of declarative constraints.

One embodiment is related to a computer-implemented method for verifying data of an electronic tax return and comprises a computerized tax return preparation system, which is programmed according to instructions of a tax return preparation software application executed by a processor of the computing device, receiving first tax data and populating a first field of the electronic tax return with the first tax data. The system receives second tax data and populates a second field of the electronic tax return different than the first field being with the second tax data. The method further comprises the system selecting a first predictive model associated with the first tax data, or both the first tax data and the second tax data, and executes the first predictive model utilizing the first tax data as an input into the first predictive model to generate a first output. The first output of the first predictive model is compared with the second tax data, and when pre-determined criteria relative to the first output is not satisfied, the system alerts the taxpayer about the second tax data so that the taxpayer can review and verify or correct the second tax data as appropriate.

Another embodiment is related to a computer-implemented method for verifying data of an electronic tax return and comprises a computerized tax return preparation system including a tax return preparation software application executed by a processor of a computing device and operable to prepare the electronic tax return, receiving taxpayer-related data and first tax data, and populating a first field of the electronic tax return with the first tax data. The method further comprises the computerized tax return preparation system selecting a first predictive model associated with the taxpayer-related data and executing the first predictive model utilizing the taxpayer-related data as an input into the first predictive model, execution of the first predictive model generating a first output. The computerized tax return preparation system compares the first output and the first tax data and generates an alert indicating that the taxpayer should verify the first tax data when the first tax data does not satisfy pre-determined criteria relative to the first output.

Yet another embodiment is related to a computer-implemented method for verifying data of an electronic tax return and comprises a computerized tax return preparation system including a tax return preparation software application executed by a processor of a computing device, receiving first tax data and populating a first field of the electronic tax return with the first tax data, receiving second tax data and populating a second field of the electronic tax return different than the first field being with the second tax data. The method further comprises the computerized tax return preparation system executing the first predictive model utilizing the first tax data as an input into the first predictive model. The first predictive model is an algorithm created using a modeling technique selected from the group consisting of logistic regression, naive bayes, K-means clustering, clustering, k-nearest neighbor, or neural networks. Execution of the first predictive model generates a first output that is compared with the second tax data. The method further comprises the computerized tax return preparation system generating an alert indicating that the taxpayer should verify the second tax data when the second tax data does not satisfy pre-determined criteria relative to the first output.

A further embodiment is related to a computer-implemented method for verifying data of an electronic tax return based on a prediction of what that data should be and comprises a computerized tax return preparation system including a tax return preparation software application executed by a processor of a computing device and operable to prepare the electronic tax return, receiving taxpayer-related data and first tax data, which may be from a source other than the electronic tax return being prepared. The method further comprises the computerized tax return preparation system populating a first field of the electronic tax return with the first tax data and selecting a first predictive model associated with the taxpayer-related data. The method further comprises the computerized tax return preparation system executing the first predictive model utilizing the taxpayer-related data as an input into the first predictive model, which generates a first output. The computerized tax return preparation system compares the first output and the first tax data, and generates an alert indicating that the taxpayer should verify the first tax data when the first tax data does not satisfy pre-determined criteria relative to the first output.

Another embodiment is related to a computer-implemented method for checking for electronic tax return data errors and comprises a computerized tax return preparation system, executed by a processor of a computing device and comprising a constraint engine, receiving electronic tax data and populating a field of an electronic tax return with the electronic tax data. The method further comprises the constraint engine a constraint of a tax authority requirement associated with the received electronic return data, the tax authority requirement and the constraint being expressed in a declarative programming format, and comparing the electronic tax return data and the constraint and determining whether the electronic tax return data satisfies the constraint. The method further comprises the constraint engine generating an output indicating whether the electronic tax return data satisfies the constraint. An alert being generated (e.g., in response to a non-binding suggestion generated by a logic agent and provided to a user interface controller) and displayed to the user based at least in part upon the output to alert the user of the tax return preparation system that the tax return data does not satisfy the constraint.

Other embodiments involve non-transitory computer-readable medium or computer program product comprising instructions, which when executed by a processor of a computing device that is programmed according to instructions of a tax return preparation application, causes the computing device to execute a process for verifying data of an electronic tax return utilizing one or more predictive models and/or checking for errors using constraints of tax law requirements expressed in a declarative manner.

Yet other embodiments are related to computerized tax return preparation systems that use predictive models and/or declarative constraints and are configured or operable to verify or check data of an electronic tax return based at least in part upon an output generated by execution of a predictive model and/or constraint engine. For example, certain system embodiments comprise a rule engine or logic agent, which is in communication with one or more processors or engines that executes one or more predictive models and process the output generated thereby to generate non-binding suggestions of a tax-related matter that should be presented to the user or action that should be taken before a state of completeness for a tax topic can be achieved. For example, a non-binding suggestion may involve an alert regarding tax data generated by execution of a predictive model. Non-binding suggestions are provided by the rule engine to a UI management module or controller, which are loosely coupled to each other. The UI management module determines how to process the non-binding suggestions (e.g., whether and when to process them), and presents an interview screen to the user incorporating a suggestion, and receives a response thereto. The response is written to a shared data store, and can be read by the rule engine, and the next iteration of non-binding suggestion generation is performed.

As another example, in systems that include a constraint engine, the constraint engine is configured or operable for analyzing electronic tax return data for data errors relative to constraints of tax law requirements expressed in a declarative manner. One embodiment of a system comprises a data store that is shared among a computerized logic agent, a UI management module or controller and a tax calculation engine. The data store comprises runtime data of the electronic tax return. The computerized logic agent is configured to read electronic tax return data from the shared data store and execute rules defined by a decision table using the electronic tax return data to identify a candidate question to be presented to the user. The constraint engine of or associated with the computerized logic agent is configured to identify a constraint of a tax authority requirement associated with runtime data received from the data store and that is expressed in a declarative format. The constraint engine is further configured to compare the runtime data and respective constraints, determine whether the runtime data satisfies respective constraints, and generate an output indicating whether the electronic tax return data satisfies the constraint, the computerized logic agent generating a non-binding suggestion for an alert to be generated and displayed to the user based at least in part upon the output indicating that the tax return data does not satisfy the constraint. The UI management module is configured to receive non-binding suggestion, determine whether to process the non-binding suggestion, and when the non-binding suggestion is processed, present the alert through an interview screen selected or generated by the user interface module, and receive an response to the alert from the user through the interview screen, wherein the response to the alert is stored to the data store.

In a single or multiple embodiments, the alert is displayed to the taxpayer through an interview screen generated by the tax return preparation software application and identifies at least one of the second tax data and the second field, e.g., by highlighted or pointing to a field or data thereof. The alert may also be an audible alert presented through a speaker of the computing device and includes a message regarding the tax data that was identified as being potentially erroneous and that is to be confirmed or corrected by the taxpayer. Thus, an alert may involve the actual data within a field, i.e., whether the data itself may be in error, or an alert may involve a field that is empty buy should be completed as determined based at least in part upon the output of an executed predictive model. For example, the output of a predictive model may be used to identify other unpopulated fields that should be populated.

In a single or multiple embodiments, predictive models may be executed at different stages relative to when data to be verified is received and a field is populated with that data. For example, a first predictive model can be executed by the computerized tax return preparation system using first tax data as the input into the first predictive model before second tax data that is to be verified is received, and before the second data is entered into the second field. As another example, a first predictive model is selected (e.g., from a library of available predictive models that could be utilized) and executed by the computerized tax return preparation system in response to the second field being populated with the second tax data. Thus, the predictive model is executed, and an alert is generated based at least in part upon the output of the predictive model is generated, in response to entry of the second data, for example, before the taxpayer enters other data into the electronic tax return. The first predictive model can also be selected and executed by the computerized tax return preparation system in response to a request by the taxpayer submitted through the tax return preparation software application.

In a single or multiple embodiments, a particular predictive model may be executed one time or multiple times during different stages of preparation of the electronic tax return to analyze the same or other tax data. According to one embodiment, predictive models are executed as new tax data is received or electronic tax return fields are populated.

According to one embodiment, the same predictive model generates multiple outputs applicable to multiple fields or types of tax data. Thus, as additional data is received and electronic tax return fields are populated, the previously generated output can be compared with the additional data, and an alert is generated identifying the additional data or field including that data when the additional data does not satisfy pre-determined criteria relative to the first output.

According to another embodiment, as additional data is received, the additional data is provided as an input to the same predictive model used before, and that additional data is used as an input (e.g., together with the previously utilized data) and the predictive model is executed again, or a second time. The second output is compared with the third tax data, and an alert identifying the third tax data or the third field is generated when the third tax data does not satisfy predetermined criteria relative to the second output.

In other embodiments, as additional data is received, a different predictive model is selected and executed. For example, after executing a first predictive model with first and second tax data as inputs, third tax data is received and a third field of the electronic tax return is populated. A second predictive model is selected based on one or more of the first, second and third tax data, executed, and the resulting second output is compared with at least the third tax data to determine whether to generate an alert regarding same.

Further, in one or more embodiments, a predictive model may be executed one time and no alert is generated for a field, whereas when that same predictive model is subsequently executed another time (e.g., with additional or other tax data inputs) an alert is generated for the field. Thus, a field may satisfy pre-determined criteria initially, but then an alert is generated later as other data is received. Further, an alert may be generated for a field after a predictive model is executed a first time, but then that alert is retracted when the predictive model is executed at a later time.

Certain embodiments may involve utilizing a set of tax data as inputs into multiple predictive models. Thus, with multiple outputs generated by multiple predictive models, a composite predictive model output can be determined (e.g., based on an average or weighting function), and the composite output is then used in the comparison with pre-determined criteria to determine whether an alert should be generated for a particular field or tax data.

In a single or multiple embodiments, the predictive model output is a range of numeric values, and in other embodiments, the predictive model output is an option of a predetermined number of options (e.g., binary Y/N options).

In a single or multiple embodiments, inputs to the predictive model are data within fields of the electronic tax return, which may be for a current tax year or a prior tax year. Inputs may also be received from an electronic data source other than the electronic tax return.

In a single or multiple embodiments, the a predictive model is an algorithm created using a modeling technique selected from the group consisting of logistic regression, naive bayes, K-means clustering, clustering, k-nearest neighbor, or neural networks.

In a single or multiple embodiments, predictive models are utilized by a tax return preparation application that is configured to include a computerized logic agent or rule engine, and a user interface manager that are loosely coupled to each other. With this system configuration, the rule engine reads electronic tax return data comprising first tax data and the second tax data and data of any alert, executes rules defined by a decision table using the electronic tax return data, and generates one or more non-binding suggestions of a topic or question that may be presented to the taxpayer. At least one of the non-binding suggestion involves the alert. The non-binding suggestions are then transmitted to a user interface management module. By non-binding, a suggestion may be considered by the user interface management module such that the rule engine suggestions do not control the user interface module. The user interface module determines one or more output tax questions to present to a user based at least in part on the suggestion(s), and generates or selects an interview screen comprising one or more output tax questions, and receives an answer to the one or more output questions from the taxpayer through the interview screen.

In a single or multiple embodiments, the constraint that is expressed in a declarative manner involves a numerical condition of tax return data and/or format thereof (e.g., data of a particular field must be a number, and that number must be greater than a certain value, less than a certain value, or within a range of values. The specified format may also involve a type of structure of data, e.g., for a social security number, a constraint is that the data must be numerical, and nine numbers.

In a single or multiple embodiments, as additional data is received, or in response to a user request for an error check, declarative constraints are checked by the constraint engine. Declarative constraint based error checks may be performed automatically in response to the field being populated with the tax return data, which may be from the user manually entering data for the first time or changing or updating data, a calculation that generates or updates data, or data that is imported from an electronic source such as a file of a financial management system.

In a single or multiple embodiments, when the user is alerted regarding a possible error, whether based on an output generated by a predictive model and/or constraint engine, the user may be permitted to continue preparation of the electronic tax return, but before filing or printing, for example, the alerts must be addressed. In other embodiments, the alert must be addressed before the user is allowed to proceed with preparation of the electronic tax return.

In a single or multiple embodiments, tax return data prediction and associated data verification and declarative constraint based error checks are performed independently of the tax return preparation system generating an interview screen that contains the alert and/or independently of the tax return preparation system executing a calculation involving the tax return data.

In a single or multiple embodiments, the constraint engine read constraint data associated with the tax return data from a declarative constraint library or a graph of the tax return preparation system, such as a calculation graph. The declarative constraint data is utilized by the logic agent or rule engine, and the logic agent generates a non-binding suggestion comprising the alert and provides the non-binding suggestion to the UI management module.

In a single or multiple embodiments, the data received by the constraint engine for use in the comparison with the declarative constraint data is data that was manually entered by the user (e.g., via the UI management module, which stores entered data to the data store, and the logic agent and associated constraint engine reads the data from the data store). In another embodiment, data received by the constraint engine for use in the comparison is a result generated by the calculation engine's processing of a calculation graph. The calculation engine writes the result to the data store, and the logic agent and associated constraint engine reads the result from the data store.

In a single or multiple embodiments, when an alert is generated based on a declarative constraint analysis, and the alert is presented to the user, the user's answer or response is written by the UI management module back to the shared data store for reading by the logic agent and associated constraint engine.

In a single or multiple embodiments, a tax return preparation system comprising a constraint engine of or associated with a logic agent that reads data from the data store. Other components may also include or be associated with a constraint engine such as the UI management module (to identify errors at the time data is received or entered through an interview screen). Thus, the comparison of data with a declarative constraint may be performed by the UI management module before the tax return data is written to the shared data store and read by the logic agent, which may also execute its own constraint engine for an additional error check. The calculation engine may also include a constraint engine such that data at the time of its calculation or generation, the tax return data is checked for errors relative to a declarative constraint. Thus, the comparison of tax return data in the form of calculation or generated data with a declarative constraint may be performed by the calculation engine before the tax return data is written to the shared data store and read by the logic agent, which may also execute its own constraint engine for an additional error check. For these purposes, according to one embodiment, the same constraint engine may be utilized for checks done for data received or generated by the logic agent, UI management module and tax calculation engine.

In a single or multiple embodiments, declarative constraints may be used to check data for an error check, or use first tax return data to determine what aspect of a declarative constraint applies to check other tax return data.

BRIEF DESCRIPTION OF THE DRAWINGS

FIG. 9A illustrates a decision table based on or derived from a completeness graph of FIG. 7.

FIG. 10 illustrates an example of how a rule engine may process a decision table when determining which question to select;

FIGS. 17A-C further illustrate how the same predictive model can be executed with different tax data inputs to generate different outputs that are utilized to determine whether tax data that is analyzed should be the subject of an alert;

FIGS. 19A-C further illustrate how different predictive model can be executed with different tax data inputs to generate different outputs that are utilized to determine whether tax data that is analyzed should be the subject of an alert;

FIG. 20 is a flow diagram one embodiment of a computer-implemented method for implementing predictive model based validation of electronic tax return data in which different predictive models are selected for execution, and an output is selected, or a composite output is generated, for determining whether tax data that is analyzed should be the subject of an alert;

FIG. 21A illustrates another embodiment in which an alert is generated for tax data if all predictive model outputs of a plurality of predictive model outputs indicate that an alert should be generated, and FIG. 21B illustrate other embodiments in which an alert is generated for tax data if at least one predictive model output of a plurality of predictive model outputs indicates that an alert should be generated;

DETAILED DESCRIPTION OF ILLUSTRATED EMBODIMENTS

Embodiments are related to checking electronic tax return during preparation of an electronic tax return and alerting the user of data that may be, or that is, in error, so that the user can review and correct data as needed. Certain embodiments involve making predictions about a user's tax return data. Other embodiments involve checking for actual errors.

Certain embodiments are related to computer-implemented methods, computerized systems and articles of manufacture or computer program products that execute one or more predictive models, examples of which include logistic regression, naive bayes, K-means clustering, clustering, k-nearest neighbor, and neural networks, to verify electronic tax return data and alerting a user of a tax return preparation application about certain electronic tax return data. Embodiments may involve collection of tax data from previously filed tax returns, and a predictive model is created to predict likely values of data for particular tax return fields based on other tax return information. For example, a predictive model may predict the likely range of a user's property tax deduction based on tax return data of the user's zip code, wages, and age.

Certain other embodiments relate to checking for actual errors utilizing constraints of a tax authority requirement expressed in a declarative manner or in accordance with declarative programming which, is a programming paradigm that expresses the logic of a computation without describing its control flow or what the program is to accomplish, in contrast to traditional tax return preparation applications that utilize imperative programming, which is in terms of sequences of steps for how the program should accomplish a result.

Embodiments also relate to checking for errors based on tax return data predictions and checking for actual errors in a tax return preparation system architecture in which tax logic is independent of or separate from the interview process in which interview screens are presented to users and in response to which users enter data. Thus, in contrast to traditional tax return preparation system architectures in which tax logic is integrated with or programmed within an interview screen, embodiments, in contrast, utilize an architecture in which the logic is separated from the interview process via a logic agent and rule engine that are loosely coupled to a user interface management module, and the logic agent, by execution of rules expressed in decision tables based on a completion graphs that is in a declarative format, generates non-binding suggestions or hints about what could be asked of the user, and the UI management module processes the various non-binding suggestions and generates or selects an interview screen incorporating the subject matter of a non-binding suggestion, which may include the basis for an alert for a potential error or actual error based on execution of a predictive model and/or utilizing data of a declarative constraint.

Figure 1:
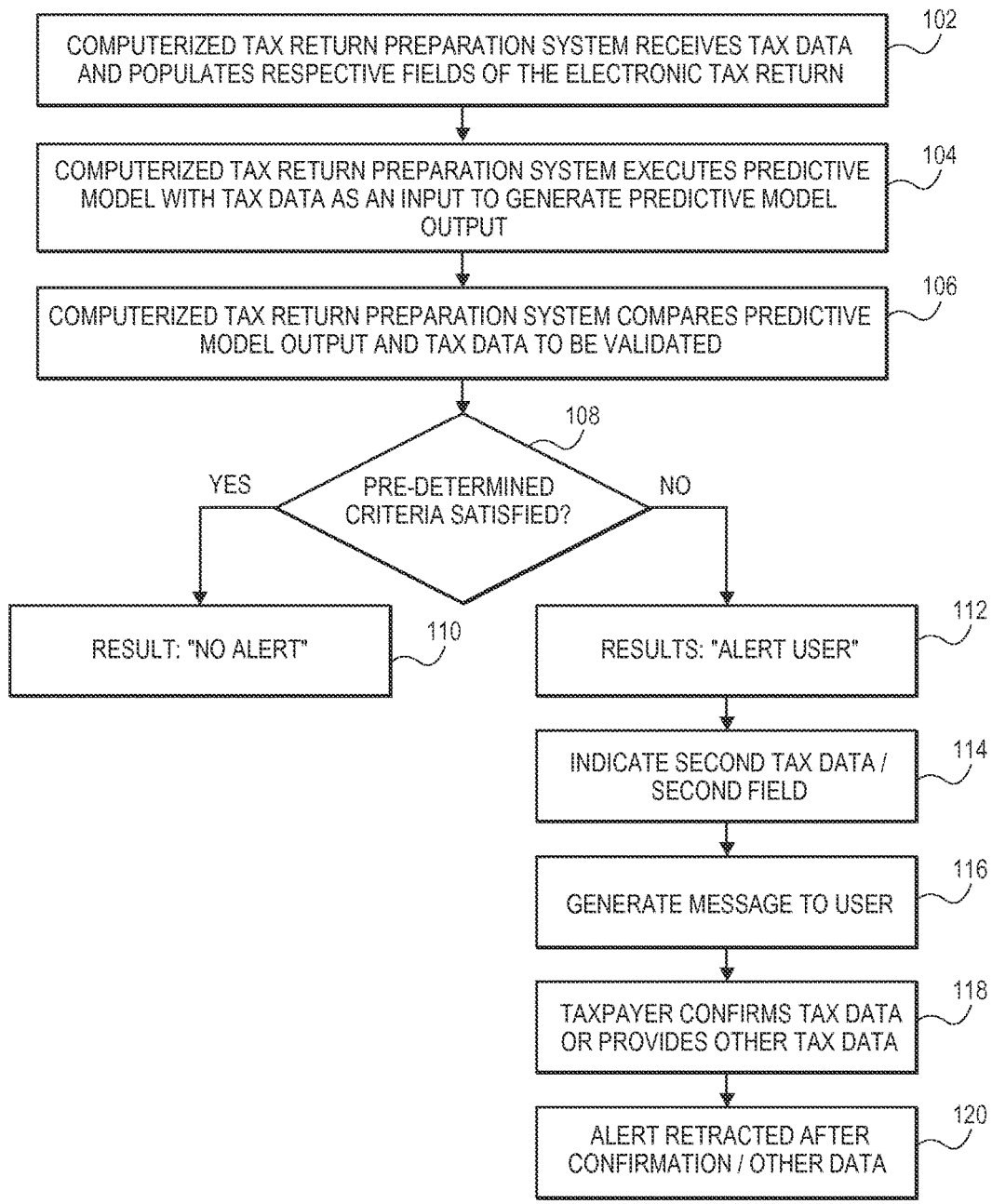
FIG. 1 is a flow diagram of one embodiment of a computer-implemented method for implementing predictive model based validation of electronic tax return data.

Referring to FIG. 1, in a computer-implemented method according to one embodiment, at 102, a computerized tax return preparation system receives tax data and populates respective fields of the electronic tax return, and at 104, executes a predictive model with tax data (e.g., first tax data) as an input to generate predictive model output. At 106, computerized tax return preparation system compares predictive model output and tax data to be verified (e.g., second tax data), and determines at 108, whether pre-determined criteria relative to predictive model output is satisfied. If so, at 110, the comparison result is that no alert is to be generated, for tax data being analyzed, and tax return preparation application continues. If not, at 112, then comparison result is that an alert is generated, and at 114, second tax data is analyzed or the second field containing the second data is identified or indicated as being the subject of an alert (e.g., by indicating alert data by color or other indicator). At 116, a message may generated and presented to the taxpayer or user of computerized tax return preparation system through tax return preparation application asking the user to confirm or correct second tax data that is the subject of alert, and at 118, user confirms or corrects second tax data, after which, at 120, alert can be retracted.

Figure 2:
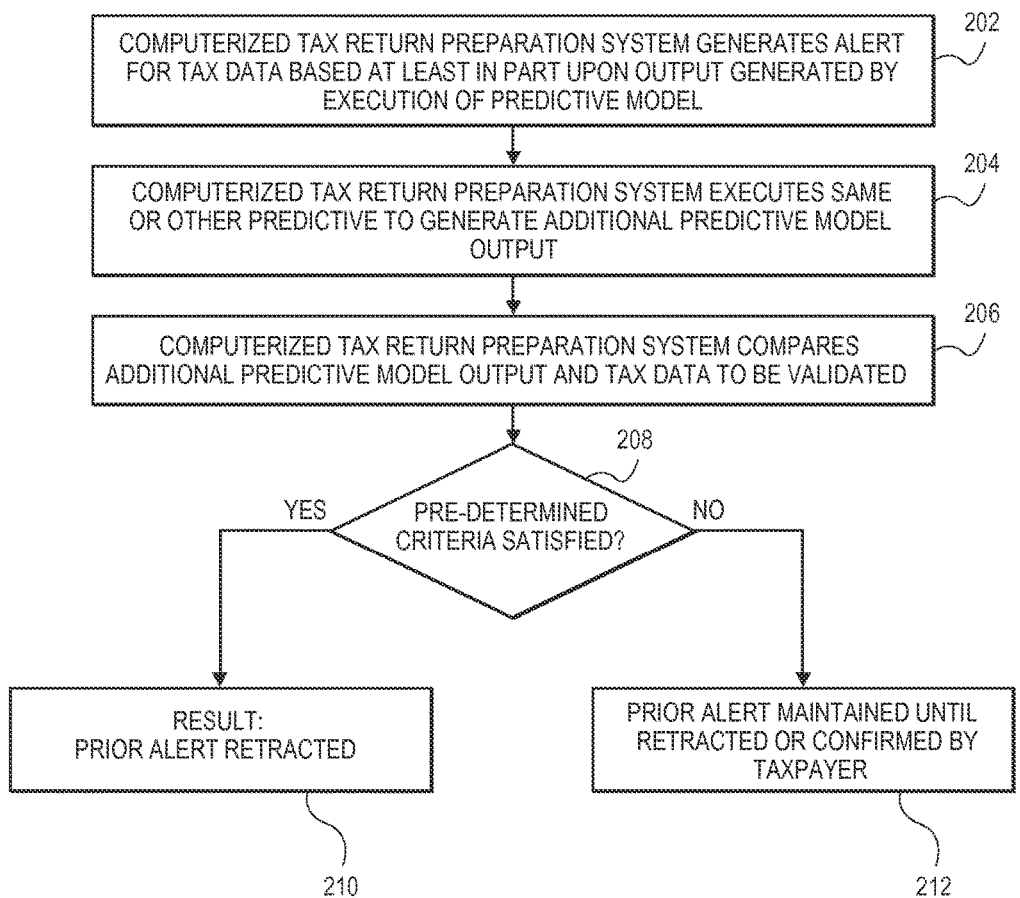
FIG. 2 is a flow diagram of one embodiment of a computer-implemented method for processing alerts generated according to embodiments utilizing predictive model based validation.

Referring to FIG. 2, according to another embodiment, alerts may be retracted before user input as a result of execution of one or more predictive models. In one embodiment, at 202, computerized tax return preparation system generates an alert for tax data based on output generated by execution of predictive model, and at 204, executes the same or other predictive model to generate additional predictive model output(s). At 206, computerized tax return preparation system compares additional predictive model output(s) and tax data to be verified, and at 208, determines whether pre-determined criteria satisfied. If so, then at 210, prior alert that was generated is refracted (e.g., before receiving confirmation or other data from the taxpayer). If not, then at 212, previously generated alert can be maintained but may be subsequently retracted when user provides confirmation or corrected data. Other aspects of embodiments are described with reference to FIGS. 3-27.

Figure 3:
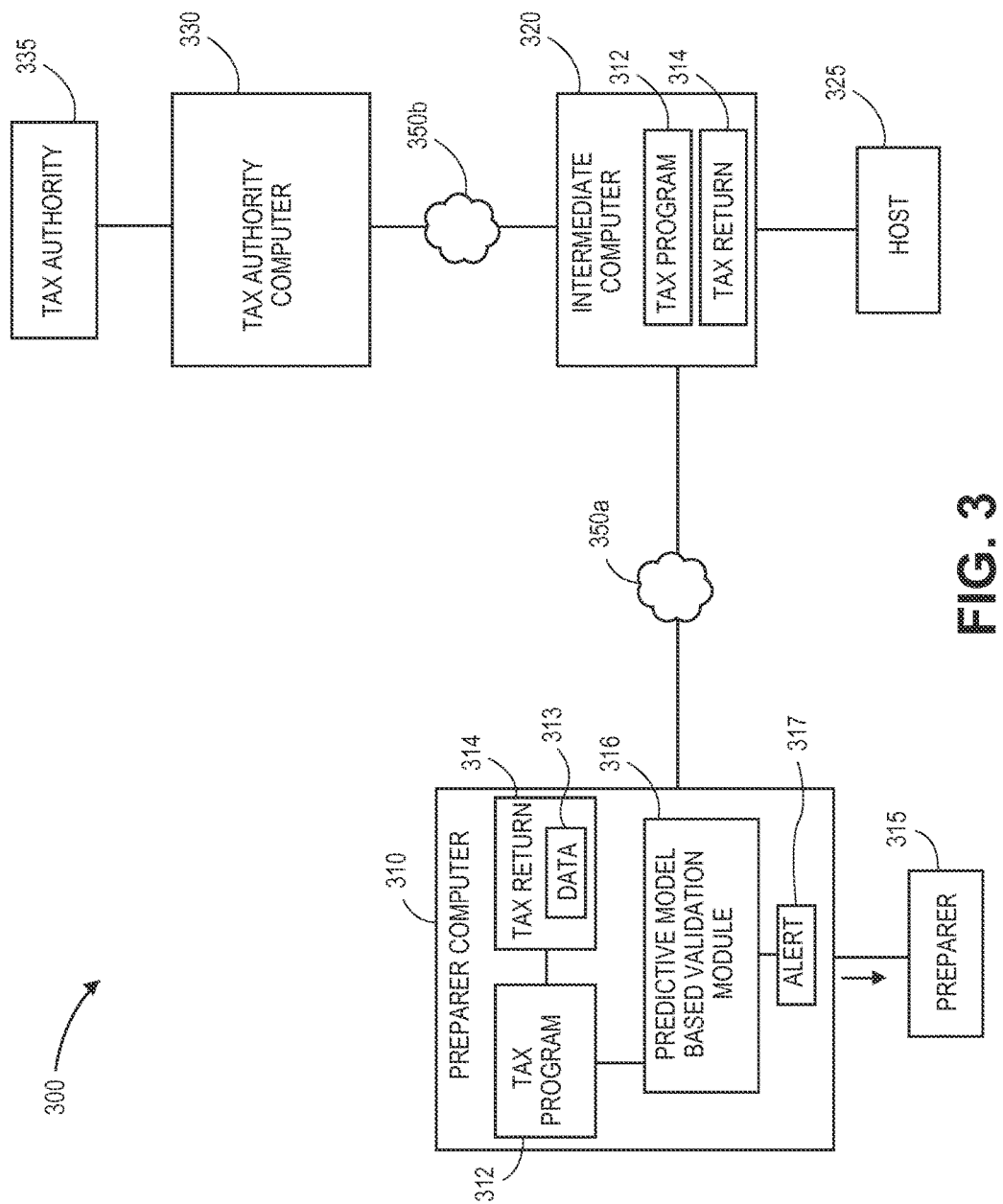
FIG. 3 is a block diagram of a system showing components involved in the methods shown in FIGS. 1-2.

Referring to FIG. 3, according to one embodiment, a system 300 for verifying tax data and generating an alert 317 that is presented to a preparer or user utilizes predictive model based validation of electronic tax return data 313 comprises or involves a first computing apparatus or computer 310 on which a tax return preparation program 312 (identified as "tax program" 312 in FIG. 3) executes to prepare an electronic tax return 314 (identified as "tax return" 314 in FIG. 3) that includes fields for tax return data 313 (data 313 in FIG. 3). According to embodiments, preparer computer 310 further comprises or accesses a special purpose predictive model based validation program or module 316. FIG. 3 illustrates tax preparation program 312 and predictive model based validation program 316 as separate programs, but in other embodiments, predictive model based validation program 316 may be a part or module of tax preparation program 312. Further, while FIG. 3 illustrates tax preparation program 312, predictive model based validation program 316 may reside on the same preparer computer 310, one or more of these system components may reside on a remote computer that is accessible by preparer computer 310 through a network.

Examples of tax preparation programs 312 that may be programmed to incorporate or utilize predictive model based validation programs 316 according to embodiments include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

System 300 may also include or involve a special purpose intermediate computer 320 managed by a host 325. Intermediate computer 320 is specially or particularly configured or operable to host an on-line version of tax return preparation program 312 and/or format and electronically file electronic tax returns 314 with a computer 330 of a tax authority 335. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts 325 that provide the special purpose intermediate computer 320 include, for example, Intuit Inc., which provides a second or intermediate computer 320 or server of the Intuit Electronic Filing Center for electronically filing tax returns 312 and other hosts 325 that provide tax preparation programs 312 and electronic filing servers.

In the illustrated embodiment, tax return preparation program 312 is a local program that executes on preparer computer 310, but embodiments may also involve on-line tax preparation programs 312 hosted by intermediate computer 320 or a separate computing apparatus or server (not shown in FIG. 3) and accessed by preparer computer 310 For ease of explanation, reference is made generally to tax return preparation program 312 and predictive model based validation program 316.

For these and other communication purposes, preparer computer 310 is operably coupled to or in communication with second or intermediate computer 320 through a network 350a, and intermediate computer 320 is operably coupled to or in communication with tax authority computer 330 through a network 350b. Each of the networks 350a-b and other networks discussed herein (generally, network 350) may be different, or two or more networks 350 may be the same depending on the system configuration and communication protocols employed. One or more or all of networks 350 may be, for example, a wireless or cellular network, a Local Area Network (LAN) and/or a Wide Area Network (WAN). Reference to network 350 generally is not intended to refer to a specific network or communications protocol, and embodiments can be implemented using various networks 350 and combinations thereof. Further details regarding embodiments and aspects of embodiments are described with reference to FIGS. 4-27 including embodiments of a tax return preparation application 312 that incorporates or utilizes embodiments of special purpose predictive model based validation program 316 and that is constructed with a logic agent that is loosely coupled to a user interface (UI) manager or controller such that, for example, tax logic is not coded or embedded within interview screens as is the case with various known tax return preparation application 312, and instead, the tax logic is separated from or independent of the controller for generating or selecting interview screens to present to the user of tax return preparation application 312.

Figure 4:
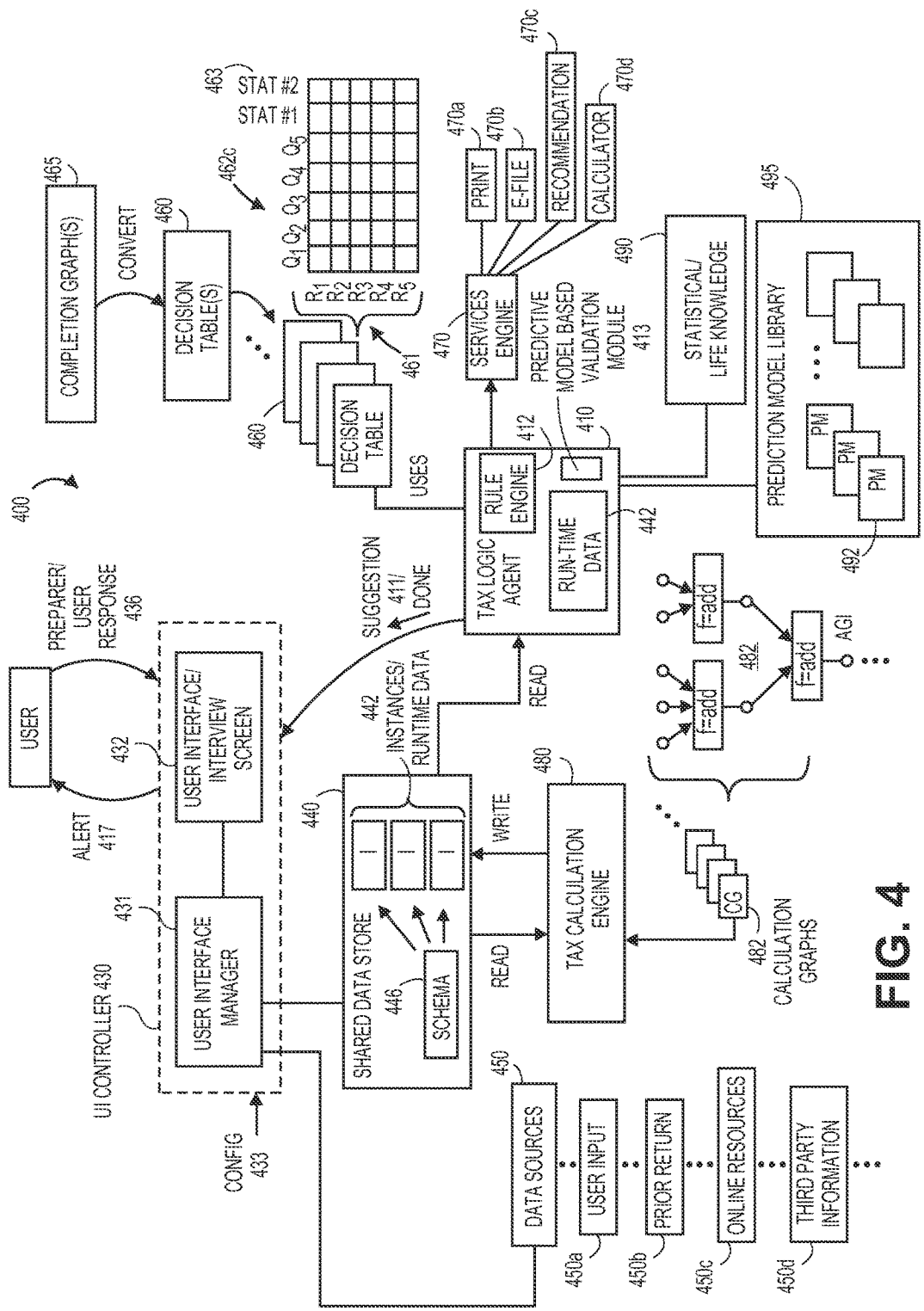
FIG. 4 illustrates a block diagram of a computerized system constructed according embodiments for implementing predictive model based validation of electronic tax return data during preparation of an electronic tax return.

FIG. 4 is a more detailed illustration of a system 400 constructed according to one embodiment for prediction-based verification of tax data and alerting 317 a user of a tax return preparation application regarding tax data. System 400 that is operable or configured to calculate taxes using rules and calculations based on a declarative data structures and declarative programming while utilizing results generated using predictive model outputs according to embodiments. In contrast to rigidly defined UI screens used in prior iterations of tax preparation software, more recent iterations provide tax return preparation software that runs on computing devices that operates on a new construct in which tax rules and the calculations based thereon are established in declarative data-structures, namely, one or more completeness graphs and one or more tax calculation graphs. Use of these declarative data structures permits the UI to be loosely connected, or even divorced, from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. After completeness for each tax topic has been achieved, an electronic return can then be prepared and filed with respect to the relevant taxing jurisdictions.

As generally illustrated in FIG. 4, system 400 constructed according to one embodiment includes a tax logic agent (TLA) 410 comprising or executing a rule engine or processor 412 that is used to scan or analyze decision tables 460 using runtime or instance data 442. TLA 410 operates in conjunction with shared data store 440 whereby updated tax data represented by instances 442 are read by TLA 410. Runtime data 442 read from shared data store 440 represents the instantiated representation of the canonical tax schema 446 at runtime. TLA 410 may contain therein a rule engine 412 that utilizes a fact cache and that generates either non-binding suggestions 411 for additional question(s) to present to a user or a "Done" instruction which indicates that completeness has occurred and additional input is not needed for a particular tax topic. Rule engine 412 may, in certain configurations, operate in the form a Drools expert engine. Other declarative rules engines 412 or rule engines that can process declarative data structures may also be utilized, and a Drools expert rule engine is provided as one of various examples that can be utilized in embodiments.

In the illustrated embodiment, TLA 410 also includes, utilizes or is in communication with a predictive model based validation module 413 according to embodiments. While rule engine 412 and predictive model based validation module 413 are shown as separate components for purposes of explanation, it will be understood that they may both be included within TLA 410 or TLA 410 may utilize predictive model based validation module 413. For ease of explanation, reference is made generally to TLA 410 executing certain steps, or more specifically to predictive model based validation module 413.

More specifically, during runtime, TLA 410 reads runtime 442 from data store 440, and a UI management module or controller 430 and a tax calculation engine 480 are also in communication with the data store 440. TLA 410 is operable to receive runtime or instance data 442 (generally, runtime data 442) that is based on a "dictionary" of terms of a data model or schema 446 (generally, schema 446). Schema 446 may specify, define or list tax-related concepts or terms, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of schema 446. Schema 446 may also specify data constraints such as a certain format of questions and answers (e.g., answer is binary (Y/N) or a number/ value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

With continuing reference to FIG. 4, runtime data 442 stored in shared data store 440 is used by TLA 410 or a separate population component that reads from shared data store 440 to populate corresponding fields of an electronic tax return or electronic tax form that is part of or used to prepare an electronic tax return and may be received from or based on data from various data sources 450a-d (generally, data source 450). Examples of data sources 450 include user input or manual entry of data into an interview screen generated by UI controller 430, data imported from a prior year electronic tax return, data from online resources (such as online social networks or other online resources) and third parties databases or resources (such as government databases or documents, such as property tax records, Department of Motor Vehicle (DMV) records, etc. TLA 410 reads runtime data 442 from shared data store 440 and utilizes or executes rules 461 expressed in decision table 460 to determine, based on currently available runtime data 442, what other data or answers are still needed or, in other words, what conditions of a rule 461 still need to be satisfied in order to reach a conclusion or completeness for the subject matter of decision table 460, and which questions or topics 462 of decision table 460 should be presented to the user in order to obtain that other needed data to reach a conclusion. For example, a rule 461 may specify that If X, and Y, and Z, then Conclusion.

Various types of rules 461 may be utilized by embodiments. For example, "tax" rules 461 that are utilized by rule engine 412 may specify which types of data or tax documents are required, or which fields or forms of the electronic tax return should be completed. One example is if a taxpayer is married, then the electronic tax return is required to include information about a spouse. A tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of data model or schema 446.

Rules 461 may also specify tax consequences or calculations and for this purpose, TLA 410 may be in communication with other modules or services 470a-d (generally, "Additional Services" such as printing, e-filing, tax recommendations, calculation).

Rules 461 are used by the TLA 410 to identify or narrow which questions 462, as provided in decision table 460, are identified as potential or candidate questions 462c ("c" referring to "candidate") to be presented to the user. This may involve utilizing rules 461 based on one or more associated data structures such as decision table 460, which is based on completion graph 465. Completion graph 465 recites, for example, requirements of a tax authority or a tax authority rules or laws. Decision table 460 may be used for invalidation of potential questions 462 or topics and input or runtime data 442 requirements.

For example, referring to FIGS. 5-9B, and as described in further detail in U.S. application Ser. No. 14/206,834, filed Mar. 12, 2014, entitled "Computer Implemented Methods Systems and Articles of Manufacture for Suggestion-Based Interview Engine for Tax Return Preparation Application," and U.S. application Ser. No. 14/448,678, filed Jul. 31, 2014, and entitled "Computer Implemented Methods Systems and Articles of Manufacture for Preparing Electronic Tax Return With Assumption Data," and U.S. application Ser. No. 14/448,886, entitled "System and Method Representing Tax Rules and Calculations Thereof Using Declarative Data Structures, filed Jul. 31, 2014, the contents of all which are expressly incorporated herein by reference as though set forth herein in full, a completeness or directed graph 465 reflects a flow of questions and answers of requirements, rules or laws 500 a tax authority or tax collecting entity, and the completeness or directed graph 465 is converted into a decision table 460.

FIGS. 5-8 illustrate graphically how tax legislation/tax rules 500 are broken down into a completeness graph 465 and a tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5:
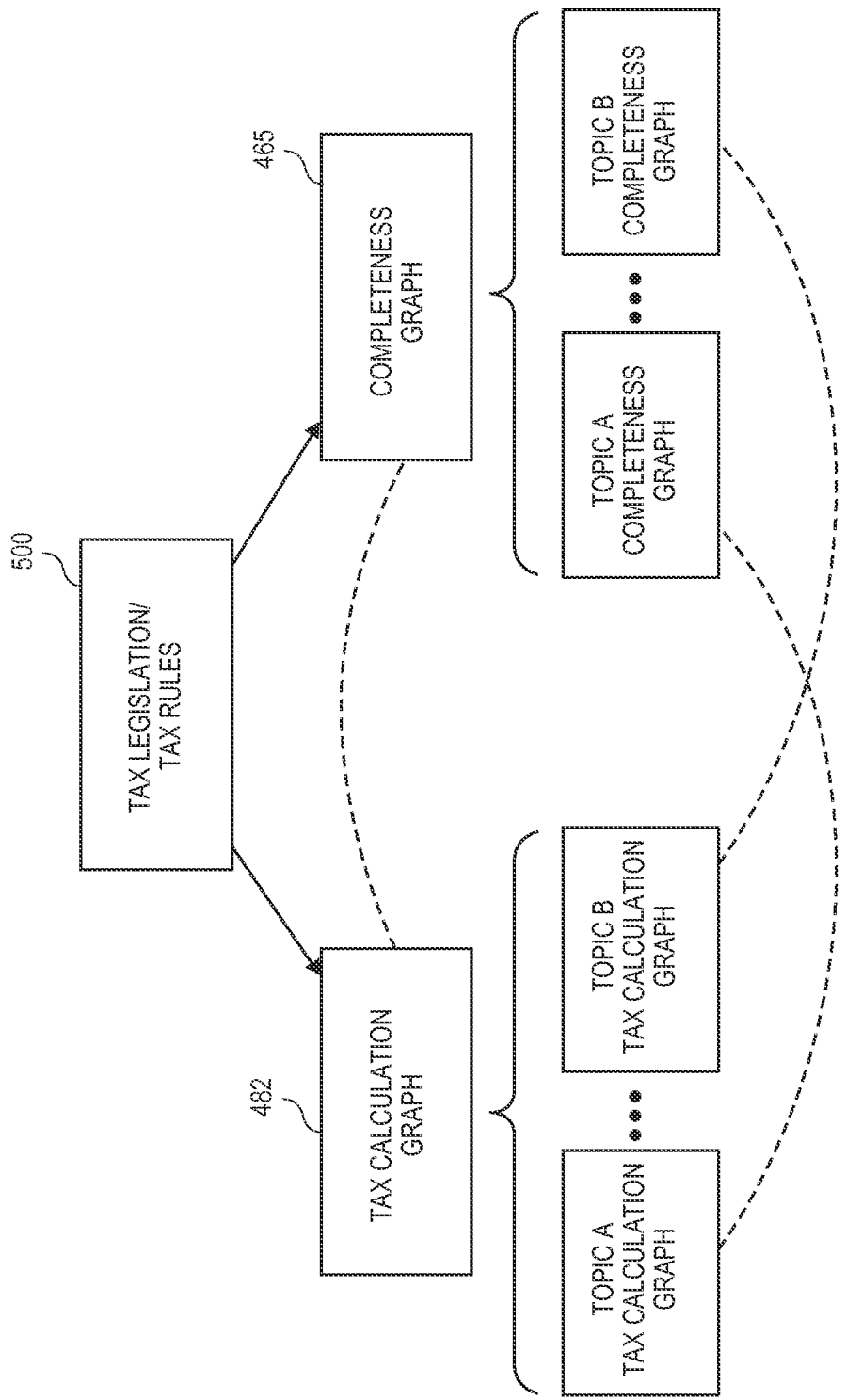
FIG. 5 schematically illustrates how tax legislation/tax rules are parsed and represented by a completeness graph and a tax calculation graph in a declarative manner according to embodiments.
Figure 6:
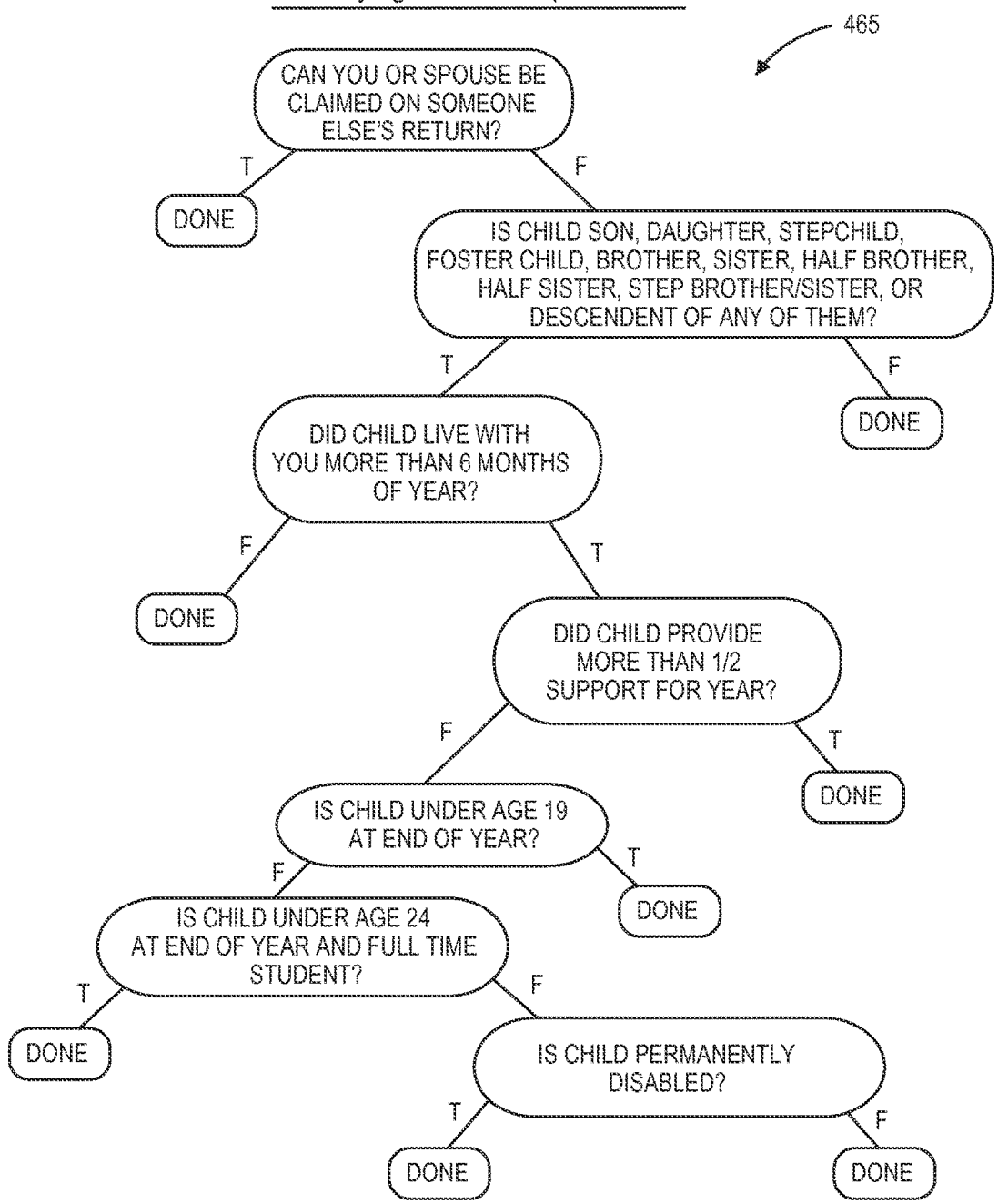
FIG. 6 illustrates an example of a simplified version of a completeness graph related to a qualifying child for purposes of determining deductions for federal income tax purposes.

FIG. 5 illustrates graphically how tax legislation/tax rules 500 are broken down into a completeness graph 465 and a tax calculation graph 482. As shown in FIG. 5, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, a completion graph 465 may reference or be associated with a particular schema 446 element and associated instance data 442 in data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed to prepare and ultimately file a tax return, and the tax return can be prepared and filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 7:
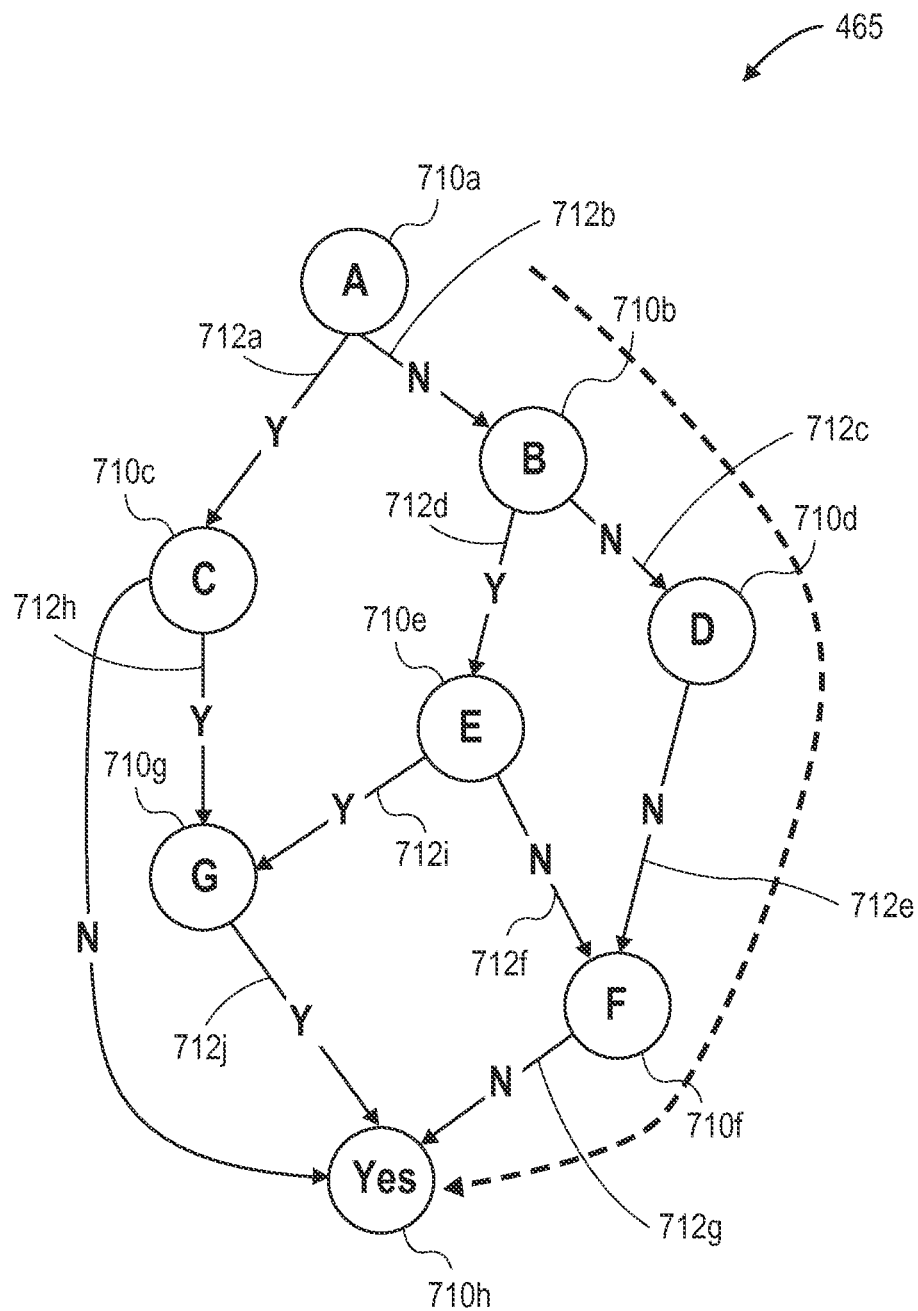
FIG. 7 generally illustrates another illustration of a completeness graph.

Completeness graph 465 and tax calculation graph 482 represent data structures that can be constructed in the form of tree. FIG. 7 generally illustrates a completeness graph 465 in the form of a tree structure including nodes 710a-h, in which node 710a is a beginning or start node, a "Yes" or termination node 710h indicating completion, and arcs 712 a-j representing different possible answers and the relationship between different nodes 710 or questions depend on the a basic or general version of a completeness graph 465 for the particular topic, such as determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 710 contains a condition that in this example is expressed as a Boolean expression that, in the illustrated embodiment, can be answered in the affirmative or negative. Arcs 712 that connect each node 710 illustrate answers and dependencies between nodes 710, and the combination of arcs 712 in completeness graph 465 illustrates the various pathways to completion. A single arc 712 or combination of arcs 712 that result in a determination of "Done" represent a pathway to completion. As generally shown in FIG. 7, there are several pathways to completion.

More specifically, FIG. 7 generally illustrates a completeness graph 465 that includes a beginning node (Node A) 710a, intermediate nodes (Nodes B-G) 710b-g and a termination node (Node "Yes" or "Done") 710h. Each of the beginning node 710a, and intermediate nodes 710b-g represents a question. Inter-node connections or arcs 712 represent response options. In the illustrated embodiment, each inter-node connection 712 represents an answer or response option in binary form (Y/N), for instance, a response to a Boolean expression. It will be understood, however, that embodiments are not so limited, and that a binary response form is provided as a non-limiting example. In the illustrated example, certain nodes 710, such as nodes A, B and E, have two response options, whereas other nodes 710, such as nodes D, G and F, have one response option.

As a specific example, referring again to FIG. 6, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 710 with a large number of pathways to completion. However, by many branches or lines within the completeness graph 465 can be ignored, for example, when certain questions internal to the completeness graph 465 are answered that eliminate other pathways, or other nodes 710 and arcs 712, within the completeness graph 465. Dependent logic expressed by completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Figure 8:
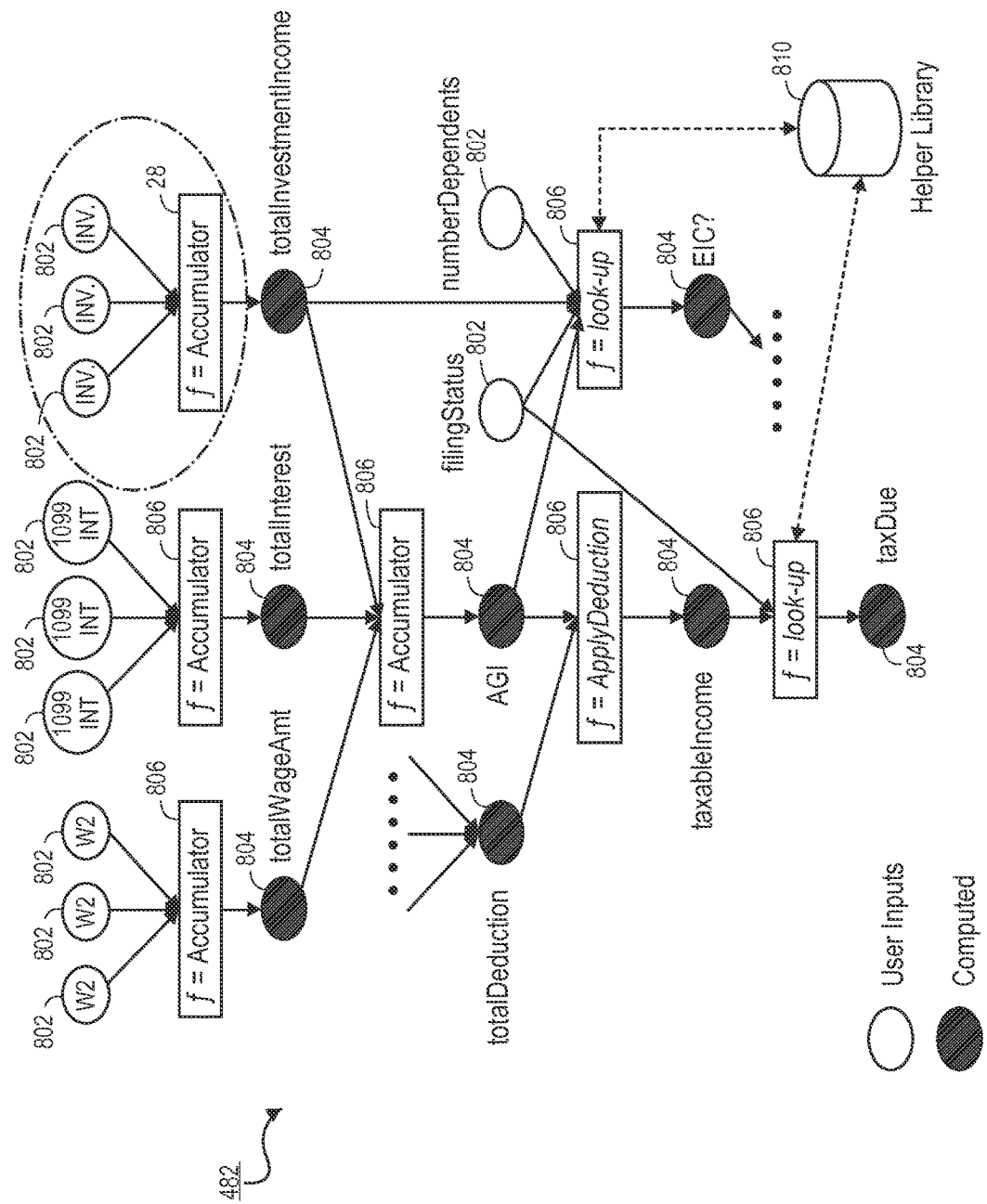
FIG. 8 illustrates an example of a calculation graph.

FIG. 8 illustrates one example of tax calculation graph 482. Tax calculation graph 482 semantically describes data dependent tax operations that used perform a tax calculation in accordance with the tax code or tax rules. Tax calculation graph 485 in FIG. 8 is a simplified view of data dependent tax operations that are used to determine the taxes Due (taxDue) based on various sources of income, deductions, exemptions, and credits. Tax calculation graph 485 is a type of directed graph and, in most situations relevant to tax calculations, is a directed acyclic graph that encodes the data dependencies amongst tax concepts or topics.

In FIG. 8, various nodes 802 are leaf or input nodes. Examples of leaf nodes 802 in this particular example include data obtained from W-2 forms, data obtained from 1099-INT forms, data obtained from other investment income (INV), filing status, and number of dependents. Typically, though not exclusively, leaf nodes 802 are populated with user inputs. That is to say the user taxpayer will enter this information from a user interface as described herein. In other embodiments, however, leaf nodes 802 may be populated with information that is automatically obtained by the tax preparation software. For example, in some embodiments, tax documents may be imaged or scanned with relevant data being automatically extracted using Object Character Recognition (OCR) techniques. In other embodiments, prior tax returns may be used by the tax preparation software to extract information (e.g., name, potential dependents, address, and social security number) which can then be used to populate the leaf nodes 802. Online resources such as financial services websites or other user-specific websites can be crawled and scanned to scrape or otherwise download tax related information that can be automatically populated into leaf nodes 802. Additional third party information sources such as credit bureaus, government databases, and the like can also be used by the tax preparation software to obtain information that can then be populated in to respective leaf nodes 802.

In still other embodiments, values for leaf nodes 802 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for leaf nodes 802 may be estimated.

Still other internal nodes referred to as functional nodes 804 semantically represent a tax concept and may be calculated or otherwise determined using a function 806. The functional node 804 and the associated function 806 define a particular tax operation. For example, as seen in FIG. 8, operation refers to total wage income and is the result of the accumulator function 806 summing all W-2 income from leaf nodes 802. Functional node 804 may include a number in some instances. In other instances, functional node 804 may include a response to a Boolean expression such as "true" or "false." Functional nodes 804 may also be constant values in some instances. Some or all of these functional nodes 804 may be labelled as "tax concepts" or "tax topics." The combination of a functional node 804 and its associated function 806 relate to a specific tax operation as part of the tax topic.

Interconnected function nodes 804 containing data dependent tax concepts or topics are associated with a discrete set of functions 806 that are used to capture domain specific patterns and semantic abstractions used in the tax calculation. The discrete set of functions 806 that are associated with any particular function node 804 are commonly reoccurring operations for functions that are used throughout the process of calculating tax liability. For example, examples of such commonly reoccurring functions 806 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 806 that is used to compute or calculate a tax liability is stored within a data store 810 which in some instances may be a database. The various functions 806 that are used to semantically describe data connections between function nodes 804 can be called upon by the tax preparation software for performing tax calculations. Utilizing these common functions 806 greatly improves the efficiency of the tax preparation software can be used by programmer to more easily track and follow the complex nature of the ever-evolving tax code. The common functions 806 also enables easier updating of the tax preparation software because as tax laws and regulations change, fewer changes need to be made to the software code as compared to prior hard-wired approaches.

Importantly, tax calculation graph 482 and associated function nodes 804 and functions 806 can be tagged and later be used or called upon to intelligently explain to the user the reasoning behind why a particular result was calculated or determined by the tax preparation software program as explained in more detail below. Functions 806 can be de-coupled from a specific narrow definition and instead be associated with one or more explanations. Examples of common functions 806 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, function 806 may also include any number of mathematical or other operations. Examples of functions 806 include summation, subtraction, multiplication, division, and comparisons, greater of, lesser of, at least one of, calling of look-ups of tables or values from a database 810 or library as is illustrated in FIG. 8. It should be understood that function nodes 804 in tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 804 may be found in multiple locations within tax calculation graph 485. Taxable income is another example of such a function node 804.

Referring to FIG. 9A, decision table 460 shown in FIG. 9A reflects the question-and-answer flow of the completeness or directed graph 465. In the illustrated example, rows of decision table 460 define rules 461 (e.g., Rules R1-R5 461a-e as shown in FIG. 9A), and columns of decision table 460 indicate questions 462 (Q1-Q5 shown in FIG. 4, or Questions A-G 462a-g shown in FIG. 9). During processing, decision table 460 is scanned or processed by TLA 410 to determine which answers are included in received runtime data 442. TLA 410 determines how much the runtime data 442 completes decision table 460 and determines or selects candidate questions 462 to be presented to user.

Figure 9B:
FIG. 9B illustrates another embodiment of a decision table that incorporates statistical data that may be used for determining a likelihood or probability of an answer to a question of the decision table according to embodiments.

In one embodiment, as shown in FIG. 9B, statistical data 463 (which may be appended as columns to the rule-question decision table 460 shown in FIGS. 4 and 9B, may be received from or based on data collected by statistical/life knowledge module 490 described in further detail below) indicates how likely a question or topic 462 is to be relevant to a user given a set of runtime data 442 and may be utilized by rule engine 442 when determining which candidate question or topic 462 to select.

For example, decision table 460 may include columns that contain statistical data 463 or other analytical data, e.g., in the form of percentages. A column (STAT1 shown in FIG. 9B) may contain a percentage value that indicates taxpayers under the age of thirty-five where $Rule_1$ is satisfied. Another column (STAT2 shown in FIG. 9B) may contain a percentage value that indicates taxpayers over the age of thirty-five where $Rule_1$ is satisfied. Any number of additional columns could be added to the decision table 460 and statistics 463 do not have to relate to an age threshold or grouping. Statistical data 463 may be used, as explained in more detail below, by the tax return preparation application to determine which of candidate questions ($Q_A$-$Q_G$) 462c should be selected by TLA 410 for presentation to or asked of the user. Statistical data 463 may be compared to one or more known taxpayer data fields (e.g., age, income level, tax filing status, geographic location, or the like) such that the question that is presented to user is most likely to lead to a path to completion. Candidate questions 462c may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

The following pseudo code generally expresses how a rule engine 412 can function utilizing a fact cache based on the runtime canonical data 442 or the instantiated representation of the canonical tax schema 446 at runtime and generating non-binding suggestions 411 provided as an input to a UI manager or controller 430. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

Rule engine (412)/Tax Logic Agent (TLA) (410)
// initialization process
Load_Tax_Knowledge_Base;
Create_Fact_Cache; While (new data from application)
Insert_data_into_fact_cache;
collection=Execute_Tax_Rules; // collection is all the fired rules and corresponding conditions
suggestions=Generate_suggestions (collection);
send_to_application(suggestions)

TLA 410 may also receive or otherwise incorporate information from statistical/life knowledge module 490. Statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. TLA 410 may use this knowledge to weight particular topics or questions related to these topics when processing rules 461 and questions 462 and generating non-binding suggestions 411. Suggestions 411 generated by TLA 410 may be, for example, a question, declarative statement, identification of a topic and may include a ranked listing of suggestions 411. Ranking may be weighted in order of importance, relevancy, confidence level, or the like. Statistical data may be incorporated by TLA 410 to be used as part of the candidate question ranking which, in turn, may be used by TLA 410 to assign a ranking to non-binding suggestions 411 generated by TLA 410.

For example, questions 462 about home mortgage interest may be promoted or otherwise given a higher weight for users in particular zip codes or income levels. Statistical knowledge 490 may apply in other ways as well. For example, tax forms often require a user to list his or her profession. These professions may be associated with transactions that may affect tax liability. For instance, a taxpayer may list his or her occupation as "teacher." The statistic/life knowledge module 490 may contain data that shows that a large percentage of teachers have retirement accounts, and in particular, 403(b) retirement accounts. This information may then be used by TLA 410 when generating its suggestions 411. For example, rather than asking generically about retirement accounts, suggestion 411 can be tailored directly to a question about 403(b) retirement accounts. According to one embodiment, candidate question scoring and ranking is used to select candidate questions 462c to use to generate a non-binding suggestion 411, and according to another embodiment, the ranking is also used to impose a ranking of the non-binding suggestions 411 themselves for reference by UI controller 430.

Data that is contained within statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by statistic/life knowledge module 490. This information may be periodically refreshed or updated to reflect the most up-to-date relationships. Generally, the data contained in statistic/life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses that data 442 as answers or inputs to decision table 460 to eliminate rules 461 that may apply which, is used to eliminate questions 462e from consideration rather than requiring the user to step through each question of a pre-determined sequence of questions in order to conclude that a particular tax situation or topic applies to the user.

For example, referring to FIG. 10, and continuing with the example of decision table 465 shown in FIG. 9, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of the decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462c that require answers based on the current runtime data 442 include Questions C and G. Thus, rule engine 412 uses decision table 460 to select one or more rules 461 and determine or select one or more candidate questions 462c that are unanswered in view of current runtime or instance data 442 and that should be presented or asked of the user to proceed to completion.

TLA 410 provides to UI controller 430 a non-binding suggestion 411 comprising a selected question or topic 461 to be addressed. In the illustrated embodiment, UI controller 430 includes a UI or user experience manager 431 that determines how to process non-binding suggestions 411 with selected questions or topics 461 and generates an interview screen 432 for the UI or selects an interview screen 432 of the UI based on the question or topic 461 of non-binding suggestion 411. UI controller 430 encompasses a UI manager 431 and a UI or screen presentation module 432 (presentation module). The presentation module 432 is controlled by the UI manager 431 and may manifest itself, typically, on a visual screen or display on a computing device utilized by the user of the tax return preparation application program. The computing device may include the display of a computer, laptop, tablet, mobile phone (e.g., Smartphone), or the like. Different user interface presentations 432 may be invoked depending, for example, on the type of display that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations may be prepared for different types of computing devices. The nature of the interface presentation 432 may not only be tied to a particular computing device but different users may be given different interface presentations 432. For example, a taxpayer that is over the age of 60 may be presented with an interview screen that has larger text or different visual cues than a younger user.

UI controller 430 may include a suggestion resolution element, a generator element, and an interview screen management element or flow/view management" module as described in U.S. application Ser. No. 14/206,834, previously incorporated herein by reference, the suggestion resolution element is responsible for resolving the strategy of how to respond to incoming non-binding suggestions 41 provided by TLA 410, and for this purpose, suggestion resolution element may be programmed or configured internally. Alternatively, suggestion resolution element may access external interaction configuration files 433.

For example, configuration file 433 for UI controller 430 may specify one or more or all of how to process non-binding suggestion 411 based on whether to consider or ignore a non-binding suggestion 411, when a non-binding suggestion 411 should be processed, content of interview screen 432 based on a non-binding suggestion 411, how to present content or interview screens 432 based on a non-binding suggestion 411 in view of a form factor or type of a computing device utilized by the user of the tax preparation application or that executes the tax return preparation application embodying system components described above, which non-binding suggestion(s) 411 have priority over others or a sequence of non-binding suggestions 411, which UI controller configuration files 433 have priority over others or a sequence of configuration files 433 in the event that multiple UI controller configuration files 433 may potentially be used for purposes of configuration conflict resolution. For example, UI controller configuration file 433 may specify that a non-binding suggestion 411 should be processed or addressed immediately or on the spot, next, at a later time, after certain or other additional tax return data has been received, or at the end of the process. UI controller configuration files 433 may also specify whether non-binding suggestions 411 should be processed individually or aggregated for processing as a group with resolution of any priority issues. As another example, a UI controller configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

UI controller 430 generates the resulting user interaction or experience or creates or prepares an interview screen 432 presented to the user. The presented interview screen or content thereof based on a library of visual assets such as pre-programmed interview screens or interview screens that are templates and that can be populated by the UI controller with a question 462 or topic of a non-binding suggestion 411. Typically, although not exclusively, in response to a user interface presentation 432 that is generated (e.g., interview screen), a user inputs data to the tax preparation software using an input device such as a mouse, finger tap, keyboard, stylus, voice entry, or the like to respond to questions. The user or taxpayer may also be asked not only to respond to questions but also to include dollar amounts, check or un-check boxes, select one or more options from a pull down menu, select radio buttons, or the like. Free form text entry may also be request of the user or taxpayer. For example, with regard to donated goods, user or taxpayer may be prompted to explain what the donated good are and describe the same in sufficient detail to satisfy requirements set by a particular taxing authority. New or updated data is then reflected in the updated instantiated representation of schema 446 and stored to shared data store 440, and this data may include a user response 436 to an alert 417 that was generated and presented to user through an interview screen selected or generated by UI controller 430.

With continuing reference to FIGS. 4 and 8, tax calculation engine 480 reads the current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by TLA 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to shared data store 440. As other types of AGI data are received or imported, tax calculation engine 480 will run calculation graphs 482 again to calculate a new AGI value, which would then be stored to shared data store data store 440.

In one embodiment, TLA 410 outputs a current tax result which can be reflected on a display of a computing device utilized by the user or taxpayer. For example, the current tax result may illustrate a tax due amount or a refund amount. Current tax results may also illustrate various other intermediate calculations or operations used to calculate tax liability. For example, adjusted gross income or total income may be displayed. Deductions (either itemized or standard) may be listed along with personal exemptions. Penalty or tax credits may also be displayed on the user's computing device. This information may be displayed contemporaneously with other information, such as user input information, or user interview questions or prompts or even narrative explanations.

TLA 410 also outputs a tax data that is used to generate the actual tax return (either electronic return or paper return). The return itself can be prepared by TLA 410 or at the direction of TLA 410 using, for example, a services engine 470 configured to perform a number of tasks or services for the taxpayer. For example, services engine 470 can include a printing option 4701a. Printing option 470a may be used to print a copy of a tax return, tax return data, summaries of tax data, reports, tax forms and schedules, and the like. Services engine 470 may also electronically file 470b or e-file a tax return with a tax authority (e.g., federal or state tax authority or other tax collecting entity). Whether a paper or electronic return is filed, data from shared data store 440 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. Services engine 470 may also make one or more recommendations 470c based on the run-time data 442 contained in or read by TLA 410. For instance, services engine 470 may identify that a taxpayer has incurred penalties for underpayment of estimates taxes and may recommend to the taxpayer to increase his or her withholdings or estimated tax payments for the following tax year. As another example, services engine 470 may find that a person did not contribute to a retirement plan and may recommend 470c that taxpayer open an Individual Retirement Account (IRA) or look into contributions in an employer-sponsored retirement plan. Services engine 470 may also include a calculator 470d that can be used to calculate various intermediate calculations used as part of the overall tax calculation algorithm. For example, calculator 470d can isolate earned income, investment income, deductions, credits, and the like. Calculator 470d can also be used to estimate tax liability based on certain changed assumptions (e.g., how would my taxes change if I was married and filed a joint return?). Calculator 470d may also be used to compare analyze differences between tax years.

Thus, in contrast to the rigidly defined user interface screens used in prior iterations of tax preparation software that incorporate or hard program tax logic inter the interview screens, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the UI to be loosely connected or even divorced from the tax calculation engine and the data and logic or rules used to determine which questions to present and associated tax calculations. Tax calculations are dynamically calculated based in tax data derived from sourced data, estimates, or user input. A smart tax TLA 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions based on requests by the TLA 410 and invocation of one or more services 470.

Figure 27:
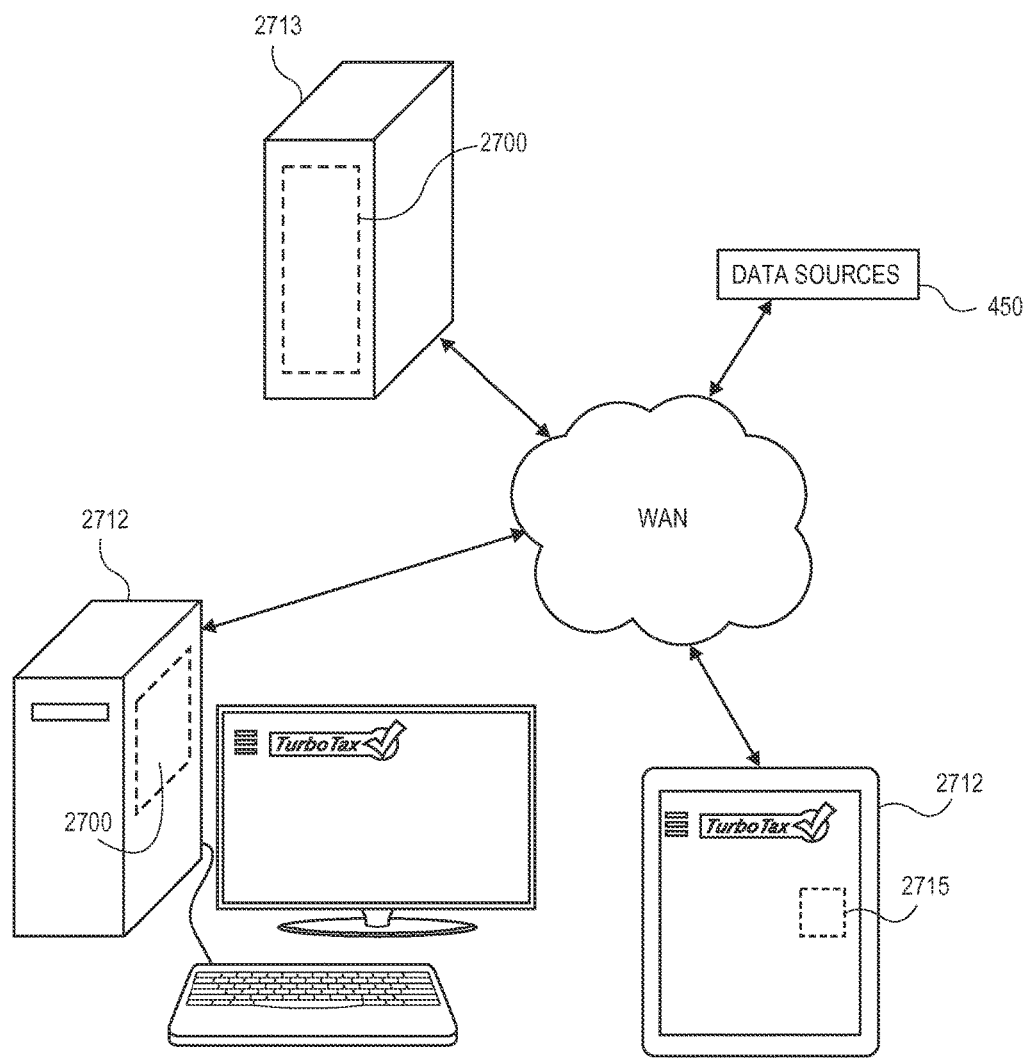
FIG. 27 generally illustrates implementation of tax return preparation software that may incorporate or utilize embodiments on various computing devices.

Having described how systems constructed according to embodiments that utilized declarative data structures and loosely coupled TLA 410 and UI controller 430 components are structured and operate, embodiments may be incorporated into tax return preparation software 2400 comprising a TLA 410 that includes or utilizes the predictive model based validation module 413. As shown in FIG. 27, can be initiated on a computing device 2712, 2713. Tax preparation software 2700 may reside on the actual computing device 2712 that the user interfaces with or, alternatively, the tax preparation software 2700 may reside on a remote computing device 2713 such as a server or the like as illustrated. In such an instances, computing device 2712 that is utilized by the user or taxpayer communicates via the remote computing device 2713 using an application 2715 executed by computing device 2712. Tax preparation software 2700 may also be run using conventional Internet browser software. Communication between computing device 2712 and remote computing device 2713 may occur over a wide area network (WAN) such as the Internet. Communication may also occur over a private communication network (e.g., mobile phone network). Other networks and combinations thereof may also be utilized depending on the system utilized.

Figure 11:
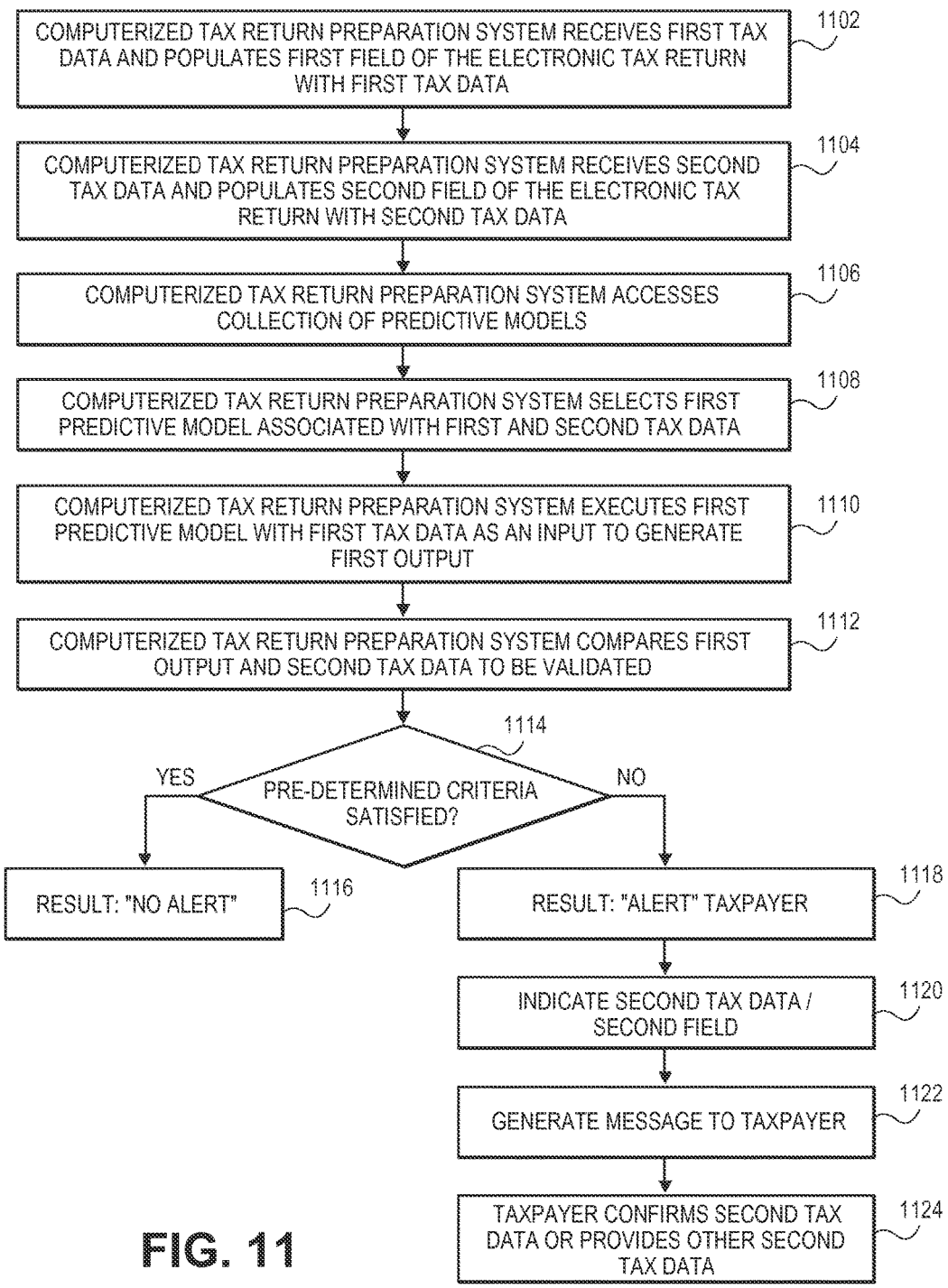
FIG. 11 is a flow diagram illustrating one embodiment for verifying tax return data and generating an alert based at least in part upon an output generated by a predictive model.
Figure 12:
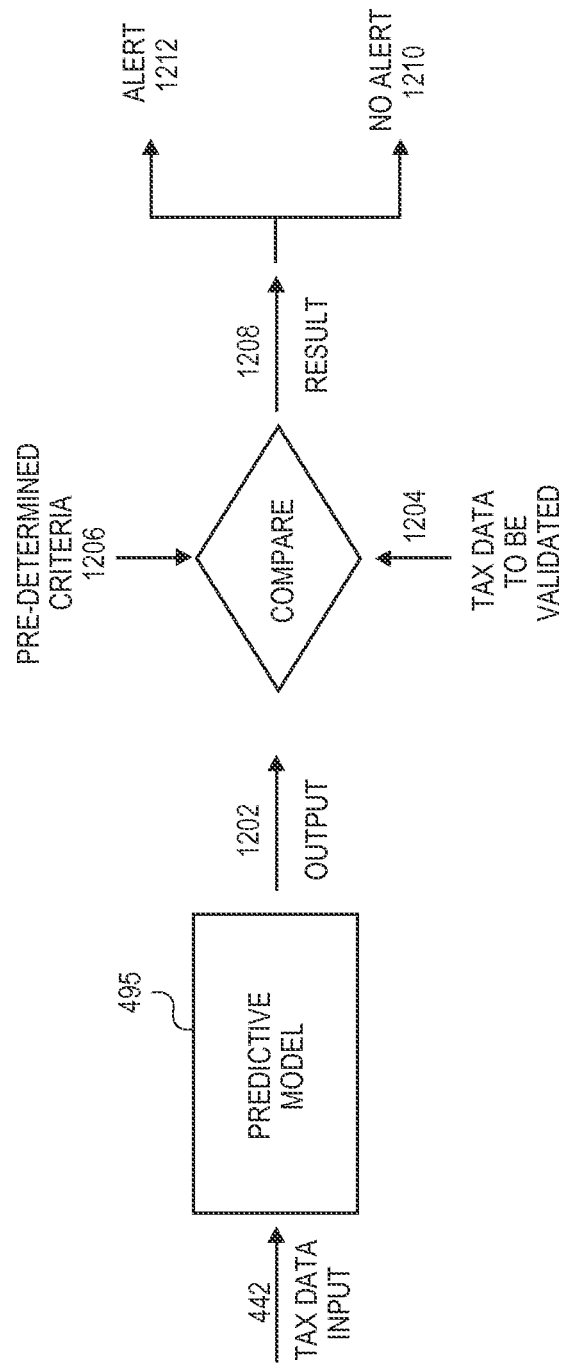
FIG. 12 is a system flow diagram illustrating how a predictive model is executed and how a generated output is utilized in a comparison to determine whether to generate an alert for tax data.
Figure 13:
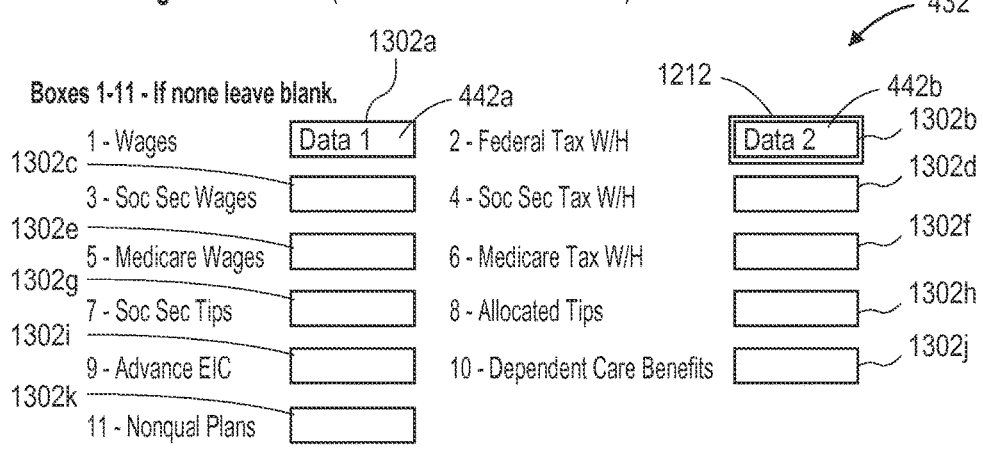
FIG. 13 illustrates an example of an interview screen generated by a tax return preparation application and showing various fields that can be populated with tax data that can be verified using predictive model execution according to embodiments.

With continuing reference to FIG. 4, and with further reference to FIGS. 11-13, according to embodiments, TLA 410 includes or utilizes predictive model based validation module 413. Prediction model based validation module 413 serves to check, verify or validate tax data 442 included within an electronic tax return, e.g., runtime data read from shared data store 440 or stored within fact cache of TLA 410.

In a computer-implemented method 1100, executed according to one embodiment with the special purpose predictive model based validation module 413, at 1102, computerized tax return preparation system (e.g., one or more system components shown in FIG. 4, e.g., TLA 410) receives first tax data 442a and populates a first field 1302a of the electronic tax return with first tax data 442a. FIG. 13 generally illustrates an interview screen 432 and fields thereof presented to the user by the UI controller 430, and the provided data is used by TLA 410 to populate corresponding fields of the electronic tax return. For this purpose, TLA 410 may read the current runtime or instance data 442 from shared data store 440, which may include tax data provided by the user via interview screen 432 presented by UI controller 430, which writes the received data to shared data store 440. TLA 410 reads this data from shared data store 440. The data may be used to at least partially populated the electronic tax return. At 1104, the computerized tax return preparation system receives second tax data 442b and stores it to shared data store 440 and/or populates second field 1302b of the electronic tax return with the second tax data 442b, and at 1106, accesses a library or collection 492 of predictive models 495.

As used herein, the term "predictive model" 495 means an algorithm utilizing as input(s) taxpayer data comprising at least one of personal data and tax data regarding the particular taxpayer (e.g., as read from shared data store 240), and configured to generate as output(s) 1202. Output 1202 is used to check, verify or validate data of an electronic tax return in real-time during preparation of the electronic tax return. Predictive model 495 is created using or based on at least one of the predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof. Predictive model 495 may be created or based on any suitable data, such as previously filed tax returns, financial data from any suitable source, demographic data from any suitable source, and the like. Predictive model 495 may involve, for example, if mortgage interest (Schedule A, line 10)>0 and real estate taxes (Schedule A, line 6)==0 then flag possible error. As another example, predictive model 495 may involve if age <30 and wages (Form 1040, line 7)<20,000 and interest (Form 1040, line 7)==0 and dividend (Form 1040, line 9a)>0 then flag possible error. A further example of a predictive model involves if someone is fairly young (age <pre-determined age) with low wage income (wages <pre-determined amount) and no interest income, then they are unlikely to have dividend income.

With continuing reference to FIG. 11, at 1108, computerized tax return preparation system selects a first predictive model 495a that involves or that is associated with first tax data 442a and second tax data 442b or associated fields or identifiers read from shared data store 240. At 1110 the selected first predictive model 495a is executed with first tax data 442a as an input into the first predictive model 495a to generate a first predictive model output 1202a. Predictive model outputs 1202 may be different formats including a predicted number, a predicted a range of numbers, a predicted answer or options selected from a pre-determined number of options (e.g., binary Y/N options), a prediction of a box of a form or section of the electronic tax return that will need to be checked or a prediction of a field or type of data that will eventually be needed for the electronic tax return.

According to one embodiment, predictive model 495 is executed in response to a field 1302 containing an input to the predictive model 495 being populated. According to another embodiment, predictive model 495 is executed in response to field 1302 for tax data 442 to be checked, verified or validated being populated. According to other embodiments, predictive model 495 is executed when both a field for input data and a field for data to be checked, verified or validated have been populated. According to yet another embodiment, predictive model 495 execution can be in response to a request by the taxpayer or user of the tax return preparation software application, e.g., submitted through an interview screen 432 generated by UI controller 430.

Continuing with reference to FIGS. 11-12, at 1112, first output 1202a is compared 1204 with second tax data 442b that is to be checked, verified or validated relative to pre-determined criteria 1206 relative to the first output 1202a. Pre-determined criteria 1206 may, for example, be that second tax data 442b must be between a minimum and maximum numerical data value of first output 1202b, or a percentage variation from a certain value of first output 1202a, or whether there is an exact match, e.g., in the case of a binary response of "Yes" or "No"). At 1114, computerized tax return preparation system determines whether pre-determined criteria 1206 satisfied. If so, then at 1116, first result 1208a of the comparison indicates that no alert is necessary, but if not (e.g., the user entered a number that is inconsistent with first output 1202a of first predictive model 495a, then at 1212, the result 1118 is that an alert 417/1212 is generated (as illustrated in FIG. 13, highlighting or marking field 1302b containing data that is inconsistent with first output 1202a).

Figure 14:
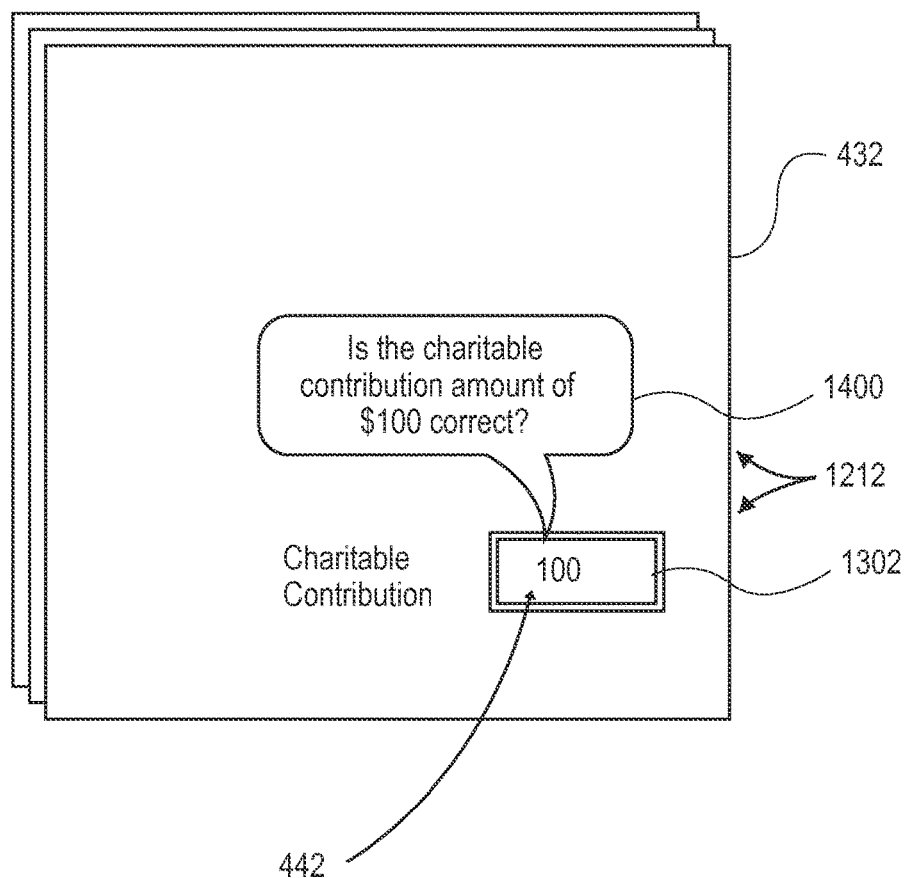
FIG. 14 illustrates another example of an interview screen generated by a tax return preparation application and including a message displayed to the user requesting the user to confirm or correct tax data identified by an alert.

According to one embodiment, and with further reference to FIGS. 13-14 at 1118, alert 417/1212 is in the form of marking or indicating tax data 442b or field 1302b that is the subject of alert 1212. For example, as shown in FIG. 13, first data 442a that served as the input into first predictive model 495a may be wages ($100,000), and alert 1212 may be generated for second or other tax data 442b of Federal Tax W/H in the amount of only $10,000. Second tax data 442a itself may be distinguished from other tax data, or the boundary of field 1302b may be distinguished. While FIG. 13 illustrates alert 1212 being within the same form or interview screen generated by the tax return preparation application (e.g., by the UI controller 430 as described above with reference to FIG. 4), fields within other forms, interview screens or other sections of the electronic tax return may also be the subject of alert 1212. Thus, the user may continue to see other alerts 1212 in other forms or sections of the electronic tax return. Moreover, while FIG. 13 illustrates an embodiment in which alert 1212 is generated for field 1302b that is populated with second tax data 442b, in other embodiments, alert 1212 may be marking or indicating an empty field, e.g., field 1302f in the example shown in FIG. 13, which is required to be eventually populated with tax data or likely to be required. Accordingly, FIG. 13 is provided as an illustrative example of one way in which predictive model output 1202 may be utilized according to embodiments and how alerts 1212 can be generated for entered data or fields yet to be populated.

Further, in the embodiment illustrated in FIG. 11, and with further reference to FIG. 14, alert 1212 may comprise generating a message 1400 to the user of the tax return preparation application, and at 1122, requesting the user to confirm or correct second tax data 442b that was the subject of alert 1212. According to one embodiment, this may be accomplished by TLA 410 generating a non-binding suggestion 411 that is provided to UI controller 430, UI controller 430 determining to process non-binding suggestion 411, and UI controller 430 generating or selecting an interview screen 432 that includes a message 1400, e.g., as generally illustrated in FIG. 14. Alert 1212 may also be in the form of an audible alert, e.g., with reference to a field of a currently displayed interview screen 432. For example, after entering first tax data 442a and executing predictive model 495, the system may present an audible message "please confirm your federal withholdings" through a speaker of the computing device utilized.

In the example illustrated in FIG. 14, message 1400 presented through interview screen 432 asks the user if second tax data 442b, e.g., an amount of $10,000 for federal tax withholding, is correct, in response to which user can confirm or correct second tax data 442b. After the user has confirmed or corrected second tax data 442b at 1124, alert 1212 indicators or markers can be retracted to indicate that user was notified and a type of action was executed in response to alert 1212. A single predictive model output 1202 may involve tax data 442 within one field 1302, or tax data 442 within multiple fields 1302, which may be in different sections or forms of the electronic tax return such that multiple alerts 1212, in the same or different screens or sections, may be generated and subsequently retracted as appropriate.

In certain embodiments, a color-coded or other visual indication system, may be utilized by the predictive model based validation module 413 to indicate current alerts 1212 that require attention (e.g., by noting second tax data 442b or fields 1302 with a "red color" and alerts 1212 that were generated but to which the user has already responded (e.g. by noting the confirmed or corrected tax data 442 with a "yellow" or "green" color). This may be particularly useful since predictive model output 1202 may be utilized to verify data of one or multiple fields 1302 of the electronic tax return and in different forms and sections thereof. Fields 1302 that were not the subject of alert 1202 can be identified as having no distinguishing attribute or color (e.g., a standard gray or other standard color for a field), or may be indicated by a green color. Moreover, while certain embodiments are described with reference to generating alert 1212 for tax data 442 that is within or populates a field 1302, embodiments may also be utilized to mark or indicate fields 1302 that are empty, and have yet to be populated, to indicate fields 1302 that are required, or likely to be required, based at least in part upon predictive model output 1202. Thus, in these embodiments, unpopulated fields 1302 can be marked (e.g., in red), whereas a user can be presented with message 1400 asking user to confirm or correct tax data 442 that is already entered into a field 1302.

Figure 15:
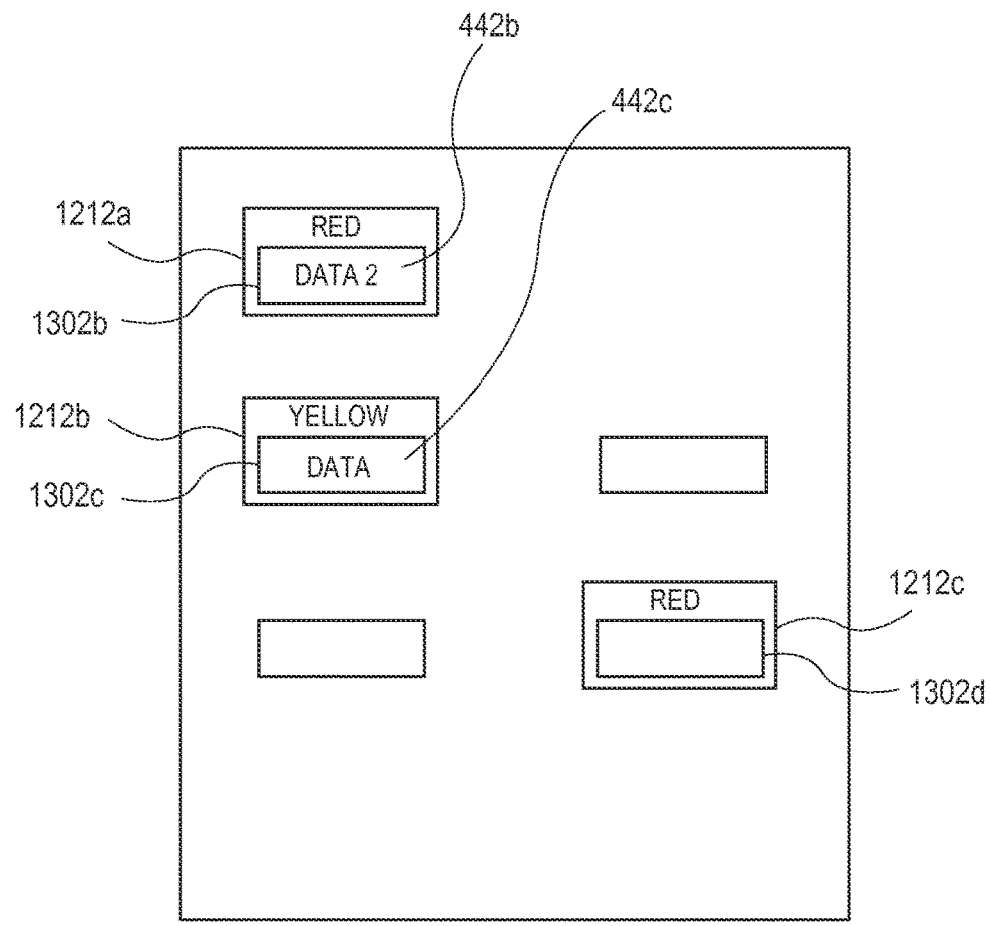
FIG. 15 illustrates one manner of generating different alert indicators according to embodiments involving utilizing different colors to indicate alert status or action to be taken regarding an alert.

For example, referring to FIG. 15, alert 1212 generated based at least in part upon output 1202 generated by executing predictive model 495 may involve field 1302b that has already been populated with tax data 442, e.g., "second tax data 442b" that has yet to be addressed by the user (thus indicated as "red" color), field 1302c that has already been populated with tax data 442c that has been confirmed by the user (thus indicated as "yellow" color) (if not retracted), and unpopulated field 1302d identified using predictive model output 1202 as a field that is required or likely to be required to be populated with data 442 (indicated as "red" color).

Figure 16:
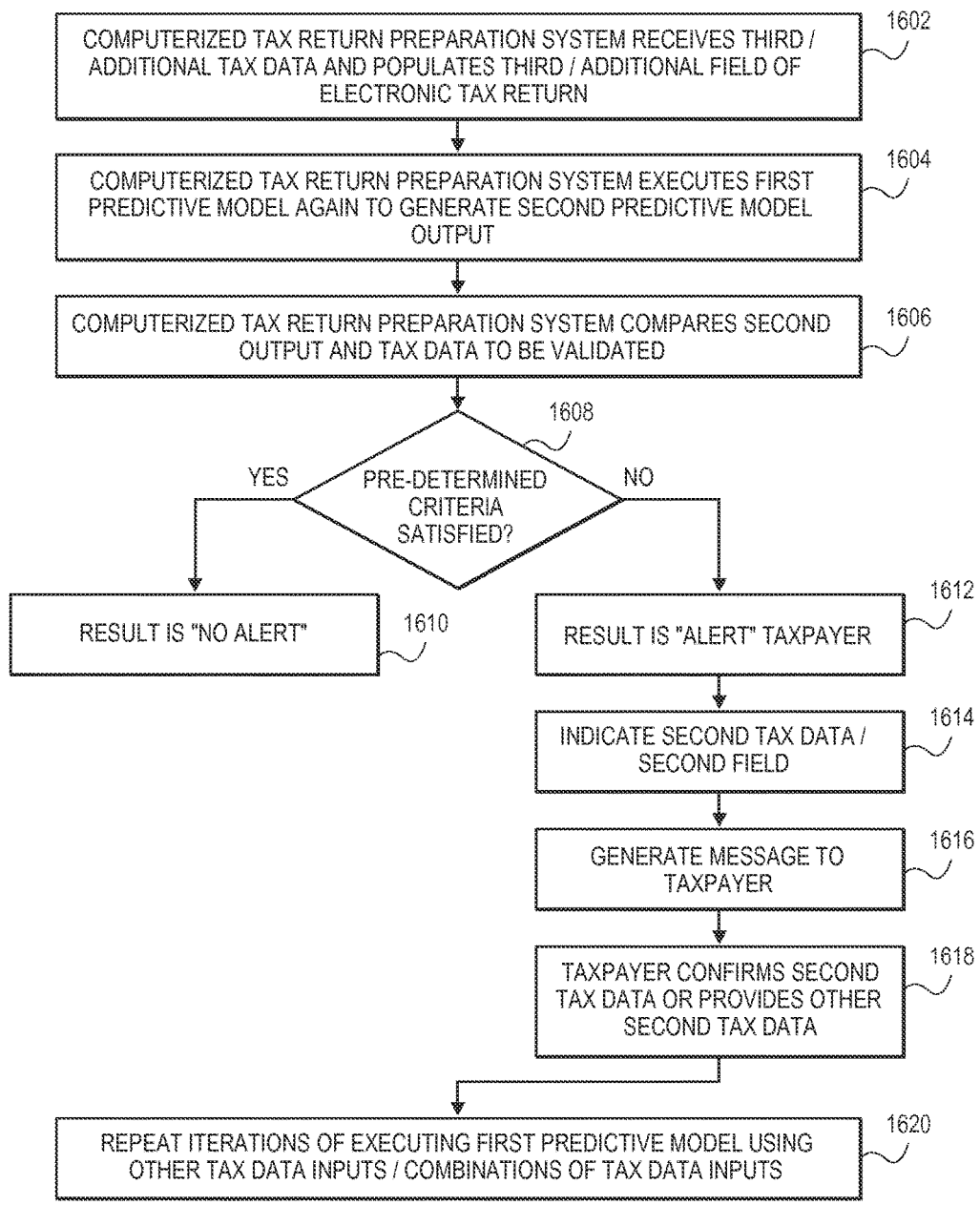
FIG. 16 is a flow diagram one embodiment of a computer-implemented method for implementing predictive model based validation of electronic tax return data in which the same predictive model is executed multiple times.

Referring to FIG. 16, in a computer-implemented method 1600 according to another embodiment, the same predictive model 495, e.g., first predictive model 495a of FIG. 11, is executed again as additional tax data 442 is received or read by TLA 410 such that additional tax data 442 is used as an additional input to predictive model 495, or tax data 442 that was previously the subject of verification or validation using first predictive model output 1202 now serves as an input to the predictive model 495 that was previously utilized, for the purpose of verifying other or new tax data 442.

For example, in the illustrated embodiment, at 1602, the computerized tax return preparation system (e.g., as shown in FIG. 4, or TLA 410 or rule engine 412 component thereof) receives third or additional tax data 442c and populates a third or additional field 1302c of the electronic tax return with third tax data 442c. As discussed above, for this purpose, TLA 410 may read the current runtime or instance tax data 442 from shared data store 440.

At 1604, the computerized tax return preparation system executes first predictive model 495a again to generate another or second predictive model output 1202b. According to one embodiment, the input to the predictive model 495a is the first tax data 442a. According to another embodiment, the inputs to the predictive model 495a include both the first tax data 442a and the second tax data 442b (which was the subject of prior validation, as described above with reference to FIG. 11). Thus, tax data 442b that was the subject of prior validation can be used as an input into the predictive model 495a that was previously utilized for that validation.

At 1606, the output 1202 generated by the second execution of first predictive model 495a is compared 1204 with third tax data 442c that is to be verified relative to pre-determined criteria 1206. At 1608, the computerized tax return preparation system determines whether pre-determined criteria 1206 satisfied. If so, then at 1610, the result 1208 of the comparison 1204 indicates that no alert 417/1212 is necessary, but if not, then at 1612, the result 1118 is that an alert 417/1212 is generated, and at 1614, 1616 and 1618, as discussed above, the third field 1302c or third tax data 442c may be indicated or marked as being the subject of alert 1212, and message 1400 may be presented to the user to confirm or correct third tax data 442c. At 1620, as additional tax data 442 is received, the same first predictive model 495a can iteratively executed using additional tax data 442 that is received, tax data 442 that was the subject of prior validations and prior predictive model 495 execution, and different combinations thereof.

For example, referring to FIG. 17A, as discussed above with reference to FIG. 11, first predictive model 495a (PM1) may be executed using first tax data 442a (TD1) as an input, and output 1202a is used in a first comparison 1204a involving second tax data 442b (TD2). Referring to FIG. 17B, as discussed above with reference to FIG. 15, after first predictive model 495a (PM1) has been executed the first time for analyzing the second tax data 442b, the same first predictive model 495a PM1 is executed again using the first tax data 442a, as well as the second tax data 442b (or second tax data 442b that was corrected by the user), as inputs, and the output 1202b generated by the second execution of the first predictive model 495a is used in a second comparison 1204b involving third tax data 442c (TD3). Referring to FIG. 17C, after the first predictive model 495a (PM1) has been executed the second time for analyzing the third tax data 442c, the same first predictive model 495a PM1 is executed again using the first tax data 442a, as well as the second tax data 442b (or second tax data 442b that was corrected by the user), and the third tax data 442c (or third tax data 442c that was corrected by the user) as inputs, and the output 1202c generated by the third execution of the first predictive model 495a is used in a third comparison 1202c involving fourth tax data 442d (TD3), and so on, as additional tax data 442 is received. While FIG. 17 illustrates an embodiment of adding previously verified data as an input for the next iteration of execution of the same or previously executed predictive model 495, embodiments are not so limited. For example, inputs into a subsequent execution of the first predictive model 495a may include the first tax data 442a and the third tax data 442c, but not the second tax data 442b, or subsequent execution of the first predictive model 495a may involve the second tax data 442b and the third tax data 442c, but not the first tax data 442a. Accordingly, it will be understood that the embodiments described above are provided for purposes of illustration and explanation, not limitation.

Figure 18:
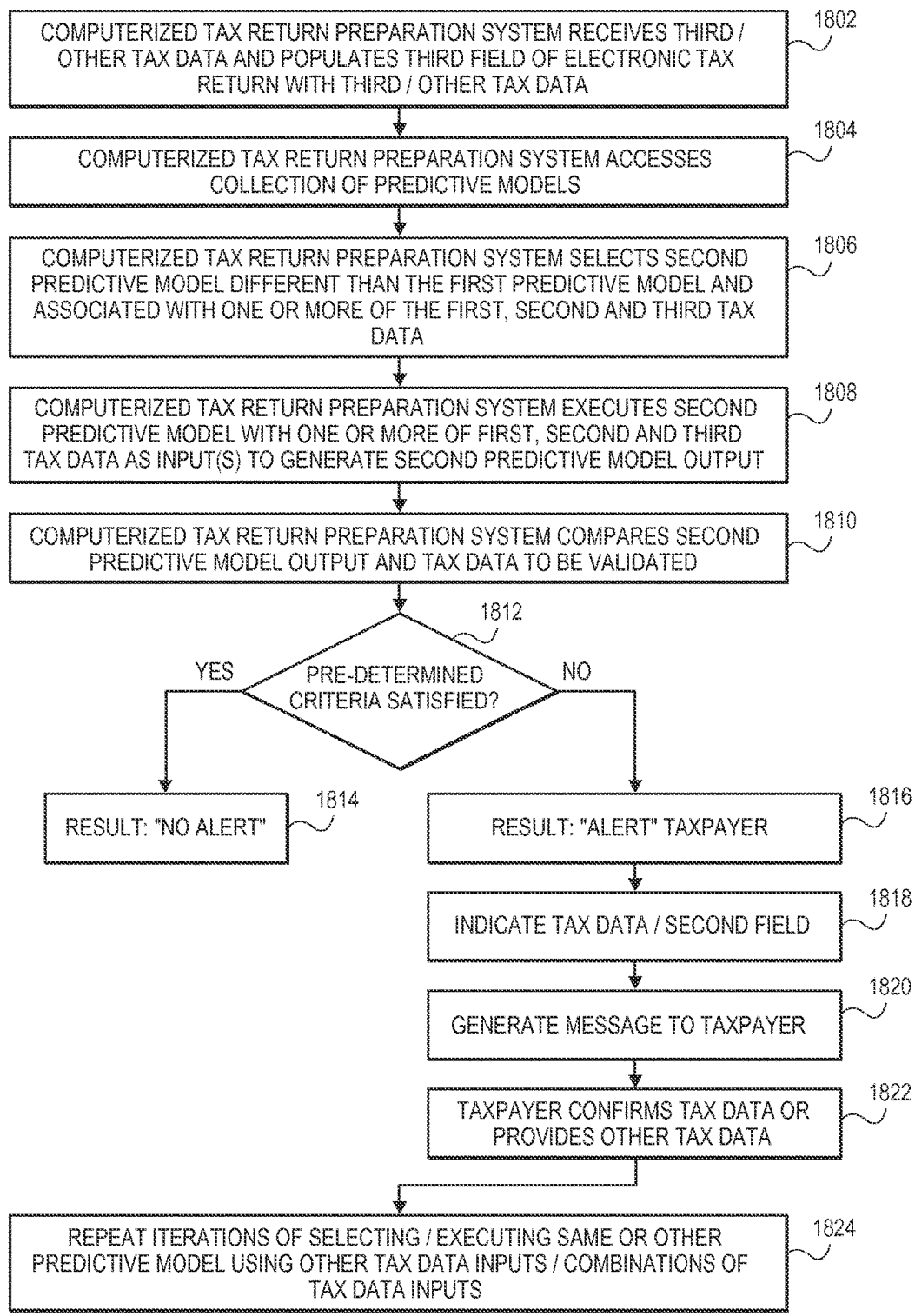
FIG. 18 is a flow diagram one embodiment of a computer-implemented method for implementing predictive model based validation of electronic tax return data in which different predictive models are selected for execution.

Referring to FIG. 18, in a computer-implemented method 1800 according to another embodiment, different predictive models 495 are iteratively selected and executed as additional tax data 442 is received, and additional tax data 442 may be used as an additional input into different predictive model 495, or tax data 442 that was previously the subject of validation using the first predictive model output 1202a now serves as an input into a different, second predictive model 495b, for the purpose of verifying or validating other tax data 442.

For example, continuing with the example shown in FIG. 11, in which a first predictive model 495a was selected, first tax data 442a was used as an input into the first predictive model 495a, and the output 1202a of executing first predictive model 495a was used to verify second tax data 442b, at 1802, the computerized tax return preparation system (e.g., as shown in FIG. 4, or TLA 410 or rule engine 412 component thereof) receives third or additional tax data 442c and populates a third or additional field 1302c of electronic tax return with third or additional tax data 442c. As discussed above, for this purpose, TLA 410 may read the current runtime or instance data 442 including additional tax data 442c from shared data store 440.

At 1804, computerized tax return preparation system accesses library or collection 492 of predictive models 495, and at 1806, selects a second predictive model 495b different than first predictive model 495a. Second predictive model 495b is associated with one or more of first, second and third tax data 442a-c, e.g., first tax data 442a and third tax data 442c, second tax data 442b and third tax data 442c, or first, second and third tax data 442a-c. At 1810, computerized tax return preparation system executes selected second predictive model 495b with one or more of first tax data 442a and second tax data 442b as input(s) to generate second predictive model output 1202b, and at 1810, compares 1204b second predictive model output 1202b and third tax data 442b to be verified or validated. As discussed above, at 1812-1822, the computerized tax return preparation system determines whether third tax data 442c satisfies pre-determined criteria 1206c relative to second output 1202c, and if so, then no alert 417/1212 is issued, but if not, then taxpayer is alerted 1212, which may involve marking or indicating third tax data 442c or field 1302c thereof and/or generating message 1400 to taxpayer asking taxpayer to confirm or correct third tax data 442c. At 1824, computerized tax return preparation system repeats 1802-1822 to select and execute different predictive models 495 using other tax data inputs 442/combinations of tax data inputs 442.

For example, referring to FIG. 19A, first predictive model 495a (PM1) may be executed using first tax data 442a (TD1) as an input, and output 1202a generated by execution of first predictive model 495a is used in a comparison 1204a involving second tax data 442b (TD2). Referring to FIG. 19B, as discussed above with reference to FIG. 18, after first predictive model 495a (PM1) has been executed for analyzing second tax data 442b, a different predictive model, a second predictive model 495b (PM2), is selected from library 492 and executed using, in the illustrated embodiment, first tax data 442a as well as second tax data 442b (or second tax data 442b that was corrected by the user) as inputs. Output 1202b generated by execution of second predictive model 495b PM2 is used in a comparison 1204b involving third tax data 442c (TD3). Referring to FIG. 19C, after second predictive model 495b (PM2) has been executed for analyzing third tax data 442c, a different predictive model, a third predictive model 495c (PM3) may be selected from library 492 and executed. In the illustrated embodiment, third predictive model 495c PM3 is executed using first tax data 442a, second tax data 442b and third tax data 442c (or second/third tax data 442b/c that was corrected by user), and output 1202c generated by execution of third predictive model 495c PM3 is used in a comparison 1204c involving fourth tax data 442d (TD4)), and so on as additional tax data 442 is received.

While FIGS. 18 and 19A-C illustrate a different predictive model 495 being used each time, embodiments may involve a combination of FIGS. 17A-C and FIGS. 19A-C, e.g., first predictive model 495a is executed, a different, second predictive model 495b is executed, second predictive model 495b is executed again (e.g., one or multiple times), a different, third predictive model 495c is selected and executed, third predictive model 495c is executed again, first predictive model 495a is executed again, and so on. Further, as noted above with reference to FIGS. 17A-C, inputs into subsequent execution of the same or a different predictive model 495 may include different types and combinations of tax data 442. For example, third predictive model 495c shown in FIG. 17C may utilize inputs of first, second and third tax data 442a-c as illustrated, or only first tax data 442a and third tax data 442c, only second tax data 442b and third tax data 442c, or only second tax data 442b, or only third tax data 442c. Accordingly, it will be understood that embodiments described are provided for purposes of illustration and explanation, not limitation, and embodiments may involve repeating execution of the same predictive model 495, selection of a different predictive model 495, or a combination of both embodiments.

While certain embodiments have been described with reference to executing a particular predictive model 495, whether the same predictive model 495 that was previously executed, or a different predictive model 495 selected from library or collection 492, other embodiments involve executing multiple predictive models 495 for verifying particular tax data 442, e.g., simultaneous execution. The multiple outputs 1202 that are generated by respective predictive models 495 can be processed in different ways for comparison and determining whether tax data 442 being analyzed satisfies pre-determined criteria 1206.

For example, referring to FIG. 20, in a computer-implemented method 2000 according to another embodiment, multiple, different predictive models 495 are selected and executed to verify particular tax data, As discussed above, at 2002-2014, computerized tax return preparation system receives first tax data 442a and populates first field 1302a of electronic tax return with first tax data 442a, receives second tax data 442b and populates second field 1302b of electronic tax return with second tax data 442b, accesses library 492 of predictive models 495, and selects first predictive model 495a associated with first tax data 442a and second tax data 442b. The computerized tax return preparation system executes first predictive model 495a with first tax data 442a as an input to generate first output 1202a.

According to embodiments, 2010 second predictive model 495b is selected from library 492, and at 2012, computerized tax return preparation system executes selected second predictive model 495b with one or more of first tax data 442a and second tax data 442b as input(s) to generate second predictive model output 1202b.

At 2016, having first output 1202a generated by execution of first predictive model 495a and second output 1202b generated by execution of second predictive model 495b, computerized tax return preparation system selects output 1202 (e.g., the most restrictive output, or the output more likely to result in tax data being analyze satisfying pre-determined criteria 1206), or generates a composite predictive model output 1202comp ("comp" referring to "composite") based at least in part upon first and second predictive model outputs 1202a, 1202b. For example, composite predictive model output 1202comp may be determined based on averaging data of the predictive model outputs 1202a, 1202b or utilizing a weighting function. According to another embodiment, composite output 1202comp may be the common or overlapping data of different outputs 1202a, 1202b.

At 2018, selected output 1202 or composite predictive model output 1202comp that is determined or generated is then used in comparison 1204 with pre-determined criteria 1206 to determine whether alert 417/1212 should be generated for a particular field 1302 or tax data 442, and as described above, at 2020-2030, a determination is made whether pre-determined criteria 1206 satisfied. If so, then no alert 1212 is necessary, but if not, alert 1212 is generated, which may indicate tax data 442 or field 1302 and/or generate message 1400 to taxpayer in response to which taxpayer can confirm or correct tax data 442. At 2032, computerized tax return preparation system can repeat iterations of selecting and executing predictive model outputs 1202 and selecting an output 1202 or generating a composite predictive model output 1202comp that is used for comparisons 1204.

Referring to FIGS. 21A-B, in another embodiment, multiple predictive model outputs 1202 generated by executing multiple predictive models 495 are used in the comparison 1204 to determine whether to generate an alert 417/1212. Referring to FIG. 21A, in one embodiment, in which a plurality of predictive models 495 (two predictive models 495a, 495b in the illustrated example) were selected and executed to generate two predictive model outputs 1202a, 1202b. Each output 1202 is used to determine whether tax data 442 being analyzed satisfies pre-determined criteria 1206 and whether an alert 1212 should be generated. In the illustrated embodiment, if both comparisons 1204a, 1204b result in generation of an alert 1212, then an alert 1212 is generated (indicated by "AND" function 2210). Thus, the embodiment in FIG. 21A may provide additional assurance or redundancy that alert 1212 is needed by requiring multiple predictive model outputs 1202 indicating an alert before determining that an alert 1212 should be generated.

Referring to FIG. 21B, in another embodiment, two predictive models 795a, 795b were also selected and executed to generate two predictive model outputs 1202a, 1202b, and each of the outputs 1202a, 1202b is used to determine whether tax data 442 being analyzed satisfies pre-determined criteria 1206 and whether an alert 1212 should be generated. However, in this embodiment, an alert 1212 is generated if at least one, or either, of the comparisons 1204 involving the different outputs 1212a-b indicates that an alert 1212 should be generated (indicated by "OR" function 2212). Thus, the embodiment in FIG. 22B may make it easier or more likely that an alert 1212 will be generated as a result of the "OR" function 2212 compared to sue of the "AND" function 2210. Whether embodiments are structured according to FIG. 22A or FIG. 22B can be configured by an administrator of the computerized tax return preparation system.

In further embodiments, when an alert 1212 is generated, whether utilizing one or multiple predictive models 495 as described above in different embodiments, alert 1212 may be withdrawn or retracted in response to certain pre-determined actions. For example, as noted above, alert 1212 can be refracted after the user provides input regarding the identified tax data. According to another embodiment, execution of predictive model 495 may result in alert 1212 being generated for certain tax data 442, but after the same predictive model 495 is executed again with other received data, or another predictive model 495 associated with the analyzed data is executed, the result may be that alert 1212 is no longer necessary. Thus, alert 1212 that was based on prior or initial input data to predictive model 495 may be withdrawn or retracted following predictive model execution based on other or additional data, which may be before a user provides input regarding the tax data.

Similarly, when predictive model 495 is executed to analyze or verify certain tax data 442, and the result of that execution is that no alert 1212 is needed, an alert 1212 for that tax data 442 may be subsequently issued after user provides input regarding the identified tax data 442 and the same or other predictive model(s) 495 is executed. Thus, execution of predictive model 495 based on initial or prior tax data 442 may result in no alert, but later, after additional data 442 that can serve as inputs is received, prediction model based validation module 413 may be used to generate alert 1212 in response to which the user can provide input regarding the identified tax data 442.

When all of the required tax data 442 has been received for the required calculations to complete the tax return, the tax return is ready to be filed. For example, as noted above, TLA 410 may determine that all of the conditions of completeness graph 465 have been satisfied such that a "fileable" tax return can be prepared with current runtime data 442. When electronic tax return is populated and completed by TLA 410 or by the direction of TLA 410 or using one or more components or services 470 as applicable, the electronic tax return can be printed and/or filed with a tax authority such federal state or local tax authority or other tax collecting entity such as Internal Revenue Service and Franchise Tax Board of the State of California.

Having described embodiments involving predicting tax return data by execution of predictive model 495 and determining that tax return data 442 may be erroneous based on the determined predictions, embodiments involving checking tax return data 442 for actual errors using declarative constraints or constraints of tax authority requirements expressed in a declarative manner will now be described. Embodiments may involve various components discussed above with reference to FIGS. 1-21, and for ease of explanation, various details are not repeated.

Figure 22:
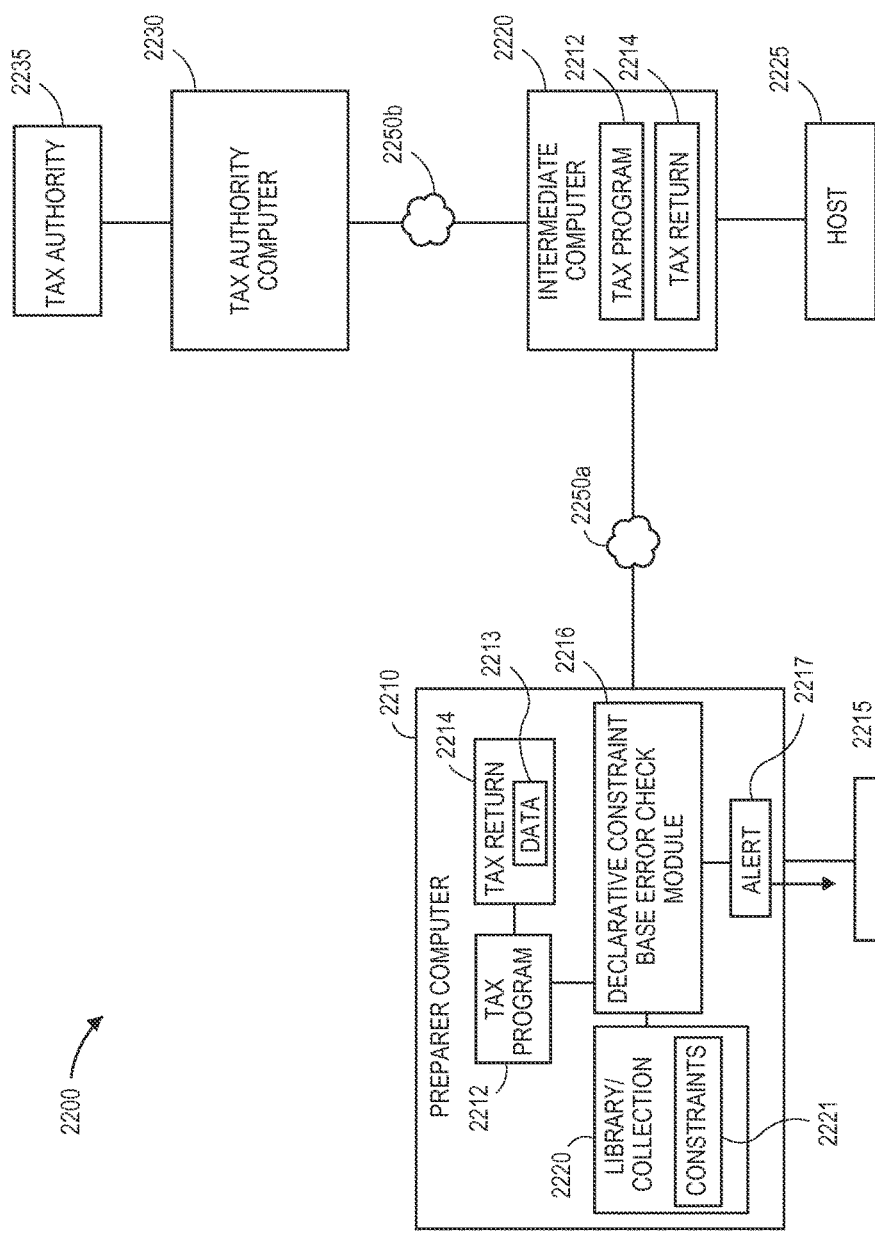
FIG. 22 is a block diagram of a system constructed according to another embodiment including a constraint engine that is configured or operable to evaluate declarative constraints to identify actual electronic tax return data errors and identify a user of a tax return preparation system according to one embodiment.

Referring to FIG. 22, according to one embodiment, a system 2200 for checking electronic tax return data 2213 for actual errors and generating an alert 2217 that is presented to a preparer or user 2215 comprises a special purpose declarative constraint based error check module or constraint engine 2216 (generally, constraint engine 2216) which, as shown in FIG. 22, is a component or module of, or associated with, the tax return preparation program 2212 that executes to prepare electronic tax return 2214. In one embodiment, constraint engine 2216 accesses a collection or library 2220 of constraints 2221 of tax authority requirements expressed in a declarative format or in accordance with declarative programming. For ease of explanation, reference is made to declarative constraints 2221. FIG. 22 illustrates tax return preparation program 2212 and constraint engine 2216 as separate programs, but in other embodiments, constraint engine 2216 may be a part or module of tax preparation program 2212, and one or more of these system components may reside on a remote computer that is accessible by the preparer computer 2210 through a network 2250. Further, while library or collection 2220 of declarative constraints 2221 is shown as being stored on preparer computer 2210, constraint engine 2216 may also access library or collection 2220 on a remote computer through network 2250.

Figure 23:
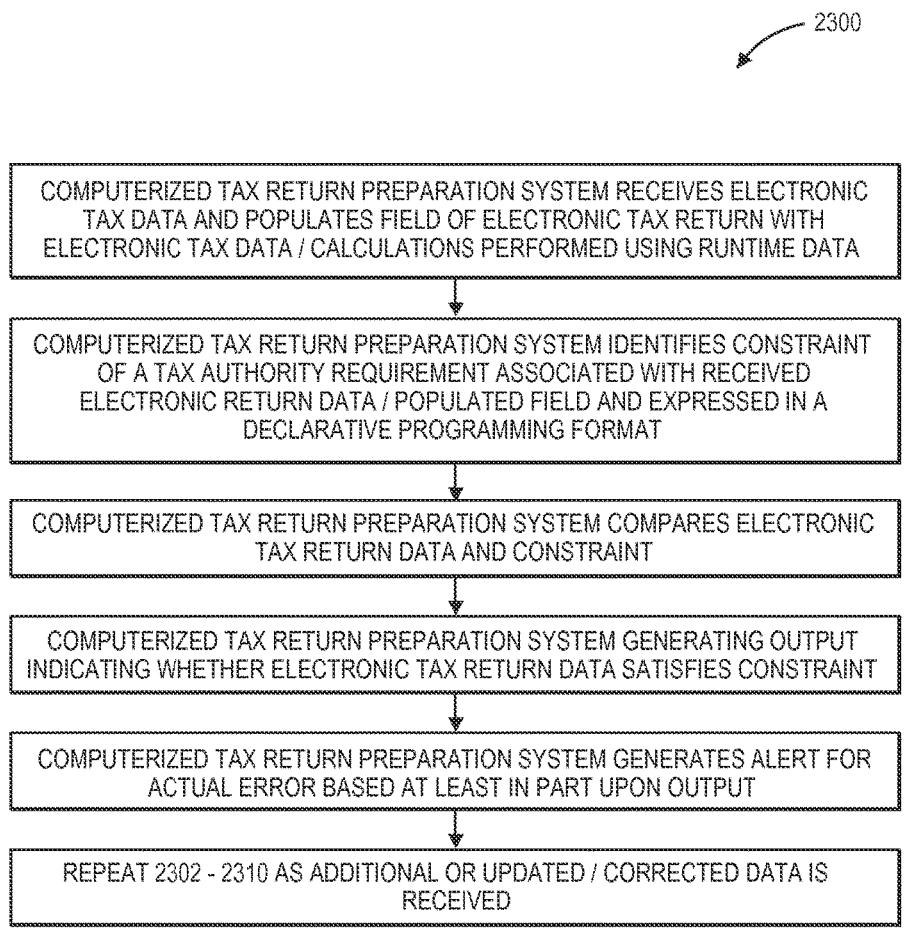
FIG. 23 is a flow diagram of a computer-implemented method of evaluating declarative constraints to identify actual electronic tax return data errors and alerting a user of a tax return preparation application according to one embodiment.

With continuing reference to FIG. 22, and with further reference to FIG. 23, in a computer-implemented method 2300 according to one embodiment, at 2302, electronic tax return data 2213 is received by computerized tax return preparation program 2212 and constraint engine 2216. A field of electronic tax return 2214 is populated with electronic tax data 2213 and any calculations that can be performed with the received or other runtime data are performed. At 2304, constraint engine 2216 identifies a constraint 2221 of a tax authority requirement associated with received electronic return data 2213 or field populated with the electronic tax return data 2213. According to embodiments, the tax law requirement is expressed in a declarative programming format or in a declarative manner, e.g., as described above. For example, after calculations are performed with the current runtime data 442, any constraint 2221 that has tax return data 442 as an input, whether by entry, importation or as a result of calculation, is identified. For this purpose, these constraints 2221 can be flagged, and then at 2306, the flagged constraints 2221 are evaluated such that the constraint engine 2216 compares electronic tax return data 2213 and data of the declarative constraint 2221. For example, when a user has entered a value for wages (Form 1040, line 7), all constraints that relate to wages are flagged and evaluated.

At 2308, constraint engine 2216 generates an output indicating whether electronic tax return data 2213 satisfies the declarative constraint 2221. At 2310, if not, then the output is used to generate an alert 2217 to notify the user 2215 of the tax return preparation program 2212 that the electronic tax return data is an actual error. At 2312, as new tax return data 2213 is received, or previously received tax data 2213 is updated or corrected in response to alerts 2217, process steps can be repeated to evaluate the new, updated or corrected data 2213 relative to applicable declarative constraints 2211.

Figure 24:
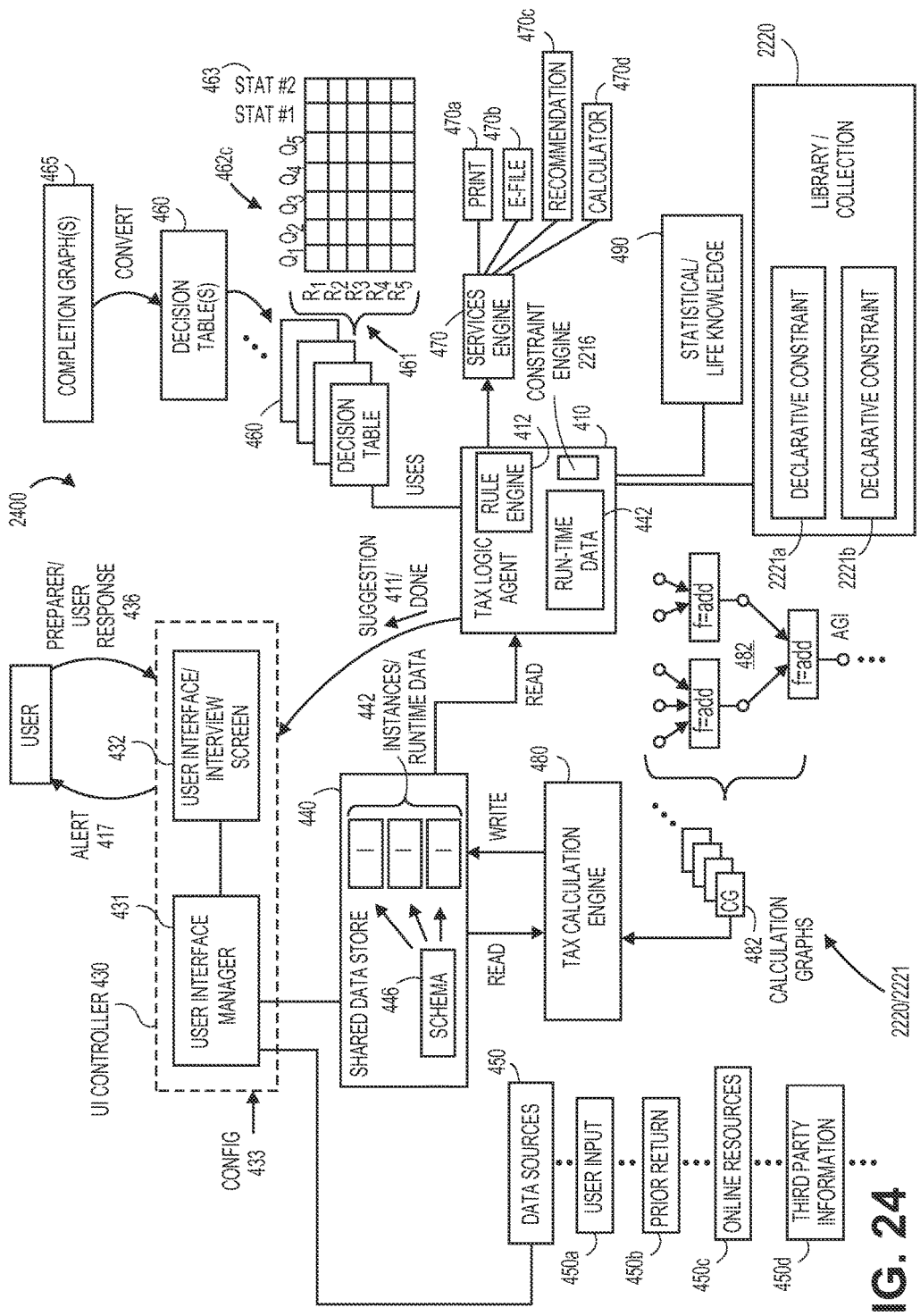
FIG. 24 illustrates a block diagram of a computerized system constructed according embodiments for implementing declarative constraint evaluation to identify tax return data errors during preparation of an electronic tax return.

According to one embodiment, referring to FIG. 24, the constraint engine 2216 is a component of a system 2400 constructed according to one embodiment in which tax data 442/2212 is checked for errors and the user of the tax return preparation application 2212 is alerted regarding tax data 442/2213 determined to be erroneous. As discussed above with reference to FIG. 4, the system 2400 shown in FIG. 24 is operable or configured to calculate taxes using rules 461 and calculations based on a declarative data structures and declarative programming while utilizing results generated using constraint engine 2216 outputs according to embodiments. In contrast to the rigidly defined user interface screens used in prior iterations of tax preparation software, more recent iterations provide tax return preparation software that runs on computing devices that operates on a new construct in which tax rules and the calculations based thereon are established in declarative data structures, namely, one or more completeness graphs 465 and one or more tax calculation graphs 482. Use of these data structures permits the UI to be loosely connected or even divorced from the tax calculation engine 480 and the data used in the tax calculations. Tax calculations are dynamically calculated based on tax data derived from sourced data, estimates, user input, or even intermediate tax calculations that are then utilized for additional tax calculations. TLA 410 runs on a set of rules 461 can review current run time data 442/2213 and evaluate missing data fields and propose suggested questions to be asked to a user to fill in missing blanks. This process can be continued until completeness of all tax topics has occurred. After completeness for each tax topic has been achieved, an electronic return can then be prepared and filed with respect to the relevant taxing jurisdictions.

As generally illustrated in FIG. 24, and as previously described with reference to FIG. 4, a system 2400 constructed according to on embodiment includes TLA 410 comprising or executing a rule engine or processor 412 and that reads runtime data 442 from shared data store 440 represents the instantiated representation of the canonical tax schema 446 at runtime. Rule engine 412 may, in certain configurations, operate in the form a Drools expert engine. Other declarative rules engines 412 may also be utilized, and a Drools expert rule engine 412 is provided as one example of how embodiments may be implemented.

In the illustrated embodiment, TLA 410 also includes, utilizes or is in communication with constraint engine 2216 according to embodiments. While rule engine 412 and constraint engine 2216 are shown as separate components for purposes of explanation, it will be understood that they may both be included within TLA 410 or that TLA 410 may utilize a constraint engine 2216.

According to one embodiment, constraint engine 2216 utilizes library or collection 2220 of declarative constraints 2221. Declarative constraints 2221 may be expressed within or based at least in part upon data of a completion graph 465 or calculation graph 482 and/or embodied in a declarative format data structure that is stored in a separate data store 2220 comprising a separate library or collection of declarative constraints 2221 based on tax authority rules, laws or requirements.

Figure 25:
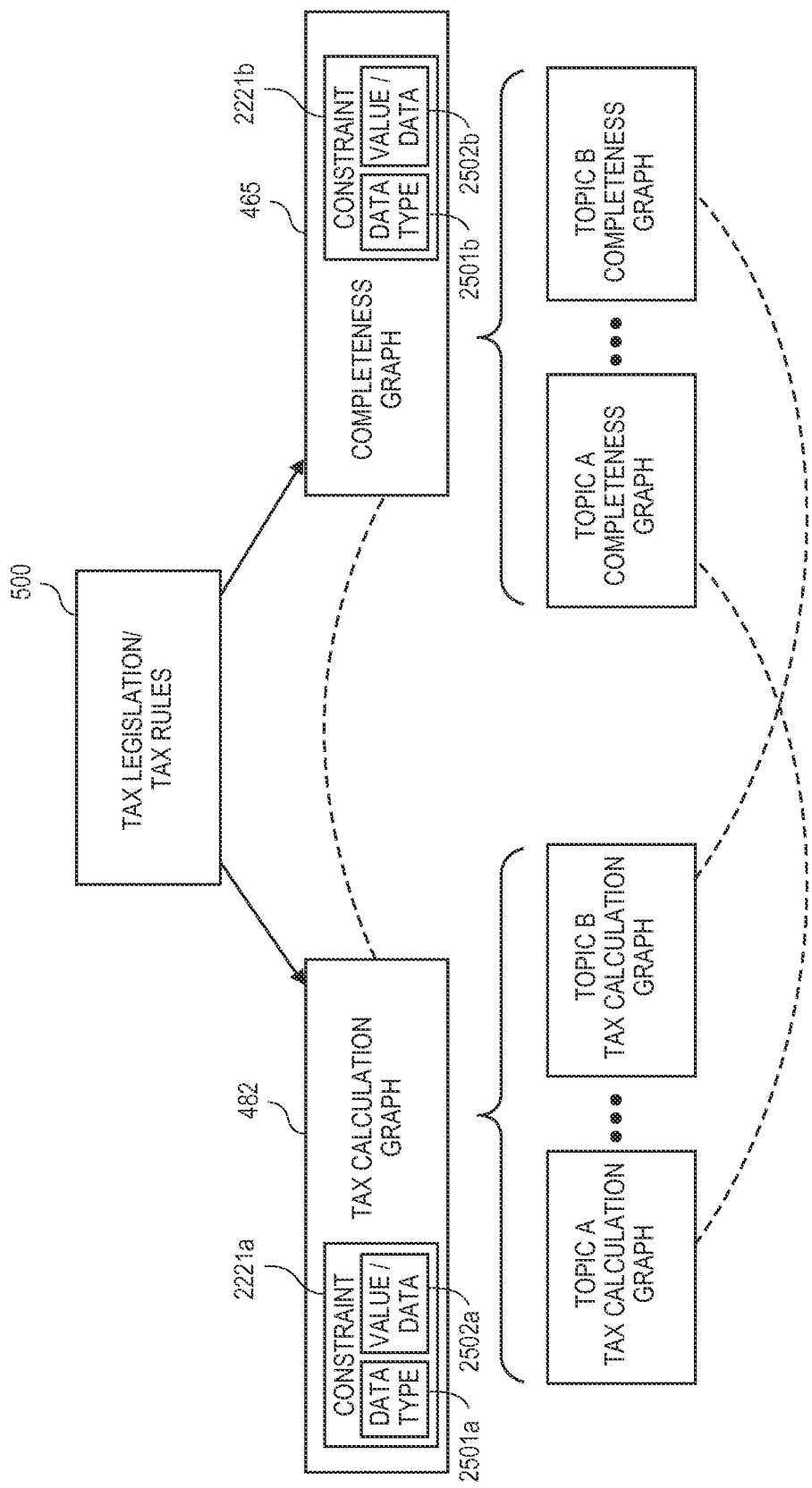
FIG. 25 schematically illustrates how tax legislation/tax rules are parsed and represented by a completeness graph and a tax calculation graph in a declarative manner according to embodiments, and how constraints thereof can be utilized according to embodiments.

Referring to FIG. 25, as discussed above with reference to FIG. 5, completeness or directed graph 465 reflects a flow of questions and answers of requirements, rules or laws 500 of a tax authority or tax collecting entity, and completeness or directed graph 465 is converted into a decision table 460 processed by TLA 410. Embodiments utilize declarative constraint 2221, which may be include data of or a component of completeness graph 465 and/or tax calculation graph 482, which are interdependent as illustrated by dashed lines. Taken collectively, completeness graph 465 and tax calculation graph 482 represent data structures that capture all the conditions necessary to complete the computations required to complete a tax return that can be filed. In contrast to the rigidly defined user interface screens used in prior iterations of tax preparation software, embodiments of the current invention provide tax preparation software that runs on computing devices that operates on a new construct in which tax rules and the calculations based thereon are established in declarative data structures including completeness graph (s) 465 and tax calculation graph(s) 482.

As shown in FIG. 25, declarative data structures or constraints 2221 may come from one or multiple sources. Constraints 2221 may include data of, or be based at least in part upon, data of one or more of completeness and calculation graphs 465, 482, which include expressions or representations of tax authority requirements expressed in a declarative manner. For example, constraints 2221 can be stored with the calculation graph 482 (e.g., the node in the calculation graph 482 for computing total income (Form 1040, line 22), is annotated with any constraints on that value and pointers to constraints that are impacted by that value). Declarative constraints can also be generated and stored in a separate collection or library 2220 (as shown in FIG. 22), e.g., as a result of being created by an administrator and stored to the library 2220 when producing calculation graph 482 and may be described in the same language as the calculation graph 482. Constraints 2221 can be stored, e.g., in library 2220, e.g. separately of a calculation graph 482. Constraints 2221 can be addressable or identified via a reference or lookup mechanism such as tax line item.

Declarative constraints 2221*a-b* (generally, 2221) of these tax authority requirements may specify, for example, respective data types 2501 a-b (generally, data type 2501) and respective values or data 2502*a-b* (generally, value or data 2502) and constraints 2221 are specified or provided in declarative form in various ways. For example, in one embodiment, declarative constraint 2221 format is provided in a human readable expression (e.g., "home equity loan <100000"). In another embodiment, constraint 2221 in declarative form is provided in a machine parsable format such as Extensible Markup Language (XML). In another embodiment, declarative constraint 2221 is parsed and maintained in memory in a form that can be interpreted (e.g., a parse tree), e.g., in cache maintained by TLA 410 as discussed above or in a separate memory as appropriate or as needed. In a further embodiment, declarative constraint 2221 is compiled and maintained in memory is an executable form (e.g., byte code or machine code). In other implementations, declarative constraint 2221 is provided by an administrator of tax return preparation program 2112, which may be based on the administrator's interpretation of a tax authority regulation, code or other requirement. In another embodiment, declarative constraint 2221 is generated from the tax code by parsing and interpreting the tax code using natural language processing. Other embodiments may involve declarative constraint 2221 being provided in machine readable form by the tax authority such as the Internal Revenue Service (IRS) or Franchise Tax Board or other tax collecting entity. Declarative constraint 221, however received or generated, and from various sources, is incorporated into a declarative data structure. Accordingly, it will be understood that declarative constraint 2221 may be generated in different ways, from various sources, and may be in various forms and stored in or read from one or multiple sources, and these examples are provided as non-limiting examples for use in embodiments.

Declarative constraints 2221 may involve different types of data and associated requirements. According to one embodiment, declarative constraint 2221 involves a data type of how data is configured or structured when entered into one or more fields. For example, a tax authority requirement may require entry of a social security number, a declarative constraint 2221 may involve the type of data that is required (e.g., numerical data) and the structure or format thereof (three numbers—two numbers—three numbers). According to another embodiment, declarative constraint 2221 involves numerical data and whether that numerical data is less than a pre-determined number (e.g., deduction must be less than "X") (e.g., the maximum amount that can be deducted for a home equity loan is $100,000), greater than a pre-determined number (e.g. wages must be greater than "Y"), or within a range of two pre-determined numbers (age must be between 18 and 62). Declarative constraints 2221 may involve data entered into one field, or data entered into one field may be used to determine declarative constraints 2221 involving data for a different or second field of the electronic tax return 2214 (if wages in field 1=X, then a specified deduction cannot be greater than Y). Thus, declarative constraints 2221 may involve data that is required for completeness or that is needed in order to have a "fileable" return 2214 and data that is involved in calculations.

Declarative constraints 2221 may be processed or evaluated at different times or stages of preparation of the electronic tax return 2214, and depending on the system configuration and processing of non-binding suggestions 411, e.g., as shown in system embodiments involving components shown in FIGS. 4 and 24. With continuing reference to FIGS. 4 and 24, constraint engine 2216 may be a component of or associated with one or more or all of TLA 410, UI controller 430, calculation engine 480 and shared data store 440.

For example, in the illustrated embodiment in which constraint engine 2216 is a component of or associated with TLA 410, TLA 410 may generate one or more non-binding suggestions 411 involving alert 417/2217 based on an output generated by constraint engine 2216 identifying an error concerning particular tax data or a field including the erroneous tax data. While suggestion 411 may be assigned as a priority suggestion (given that erroneous data has been identified by constraint engine 2216), it is possible that suggestion 411, which is non-binding upon the UI controller 430, is processed immediately, or processed later at the UI controller's 430 discretion.

According to another embodiment, constraint engine 2216 is a component of or associated with UI controller 430. Thus, as tax data is received by the UI controller, e.g. by responses or input 436 in the form of manual entry of tax data by the user or importation of data from a financial management system, constraint engine 2216 can check received data 2242 as it is received, and before it is written by the UI controller 430 to shared data store 440. If an error is identified, constraint engine 2216 can inform UI controller which may immediately generate or select an interview screen 432 to present to the user to alert 417/2217 the user regarding the identified error, and when the user responds with corrected or updated data 442, the constraint engine 2216 can check the response or answer immediately, and the process can continue until the error is resolved, or the error is marked for subsequent review.

According to a further embodiment, constraint engine 2216 is a component of or associated with calculation engine 480. Thus, as tax data 442 is generated, in the form of a result generated or derived by a calculation executed by calculation engine 480, constraint engine 2216 can receive the calculation result, check the calculation result against the corresponding declarative constraint 2221 and before it is written to the shared data store 440. If no error is identified, tax calculation engine 480 can write the data to shared data store 440, however, if an error is identified, tax calculation engine 480 can write the result to shared data store 440 with a tag or other indicator associated with that data such that when that data is later read by TLA 410 from shared data store 440, TLA 410 knows that the tax data 442 in the form of a calculation result was previously analyzed by constraint engine 2216 and it was previously determined that the result involved an error relative to declarative constraint 2221. This may then be the basis for a non-binding suggestion 411 generated by TLA 410 for UI controller 430. Further, in the event that TLA 410 also includes or is associated with the same or other constraint engine 2216, an additional declarative constraint analysis can be performed by TLA 410 to verify the error before generating and/or transmitting non-binding suggestion 411 involving declarative constraint 2221.

In another embodiment, constraint engine 2216 is a component of or associated with shared data store 240 such that as data is written to shared data store 240, by UI controller 430 and/or calculation engine 480, the data is analyzed by constraint engine 2216 to identify errors based on respective comparisons with respective declarative constraints 2221. If any errors are identified, the data can be tagged or indicated in shared data store 440, such that when TLA 410 reads the data from shared data store 440, TLA 410 knows that the tax data 442 in the form of a calculation result was previously analyzed by constraint engine 2216 and it was determined that the result involved an error relative to declarative constraint 2221. This may then be the basis for non-binding suggestion 411 generated by TLA 410 for UI controller 430. Further, in the event that TLA 410 also includes or is associated with the same or other constraint engine 2216, an additional declarative constraint 2221 analysis can be performed by TLA 410 to verify the error before generating and/or transmitting non-binding suggestion 411.

According to one embodiment, for all tax return data 442 that has been received or entered into respective fields of an electronic tax return, all appropriate constraints 2221 identified and flagged or marked as appropriate and evaluated. For a given field or tax data within a field, there may be one or multiple associated fields, such that there may be one or multiple declarative constraints 2221 to be evaluated for particular tax data 442. For example, if tax return data 442 has been received for "wages" this may trigger evaluation of multiple declarative constraints 2221 for other associated data or fields such as mortgage interest deduction, child care deductions, etc. In contrast, if tax return data 442 was received or entered for the user's social security number, there may be only one declarative constraint 2221 for this data that specifies that the data must be numerical data and includes nine numbers according to a pre-determined format. Accordingly, it will be understood that embodiments may involve different numbers of declarative constraints 2221 that involve different topics or data types, and that the above examples are provided as examples of same.

According to certain embodiments, depending on when declarative constraint 2221 comparisons are performed and whether they are performed by a constraint engine 2216 in connection with TLA 410, UI controller 430, tax calculation engine 480 and/or shared data store 440, declarative constraints 2221 can be evaluated and alerts 417/2217 for identified tax return data errors can be generated at different times. In certain embodiments, declarative constraints 2221 are analyzed immediately after user has entered data such that the user is notified or alerted of any errors right away after entry of erroneous data, and those errors can be corrected. For example, when constraint engine 2221 is part of or utilized by the UI controller 430, declarative constraint 2221 analysis can be performed as data is received and the user can be alerted right way after the evaluation has been completed in the event of an error. UI controller 430 may also determine that alerts 417/2217 should be reserved for a later time or when another section of the electronic tax return is being prepared. In other embodiments, declarative constraints 2221 are analyzed immediately after the user has been received, determined or generated, but resulting alerts 417/2217 may or may be delayed or reserved for a later time. For example, if constraint engine 2216 or utilized by tax calculation engine 480, shared data store 440 or TLA 410 identifies erroneous tax return data, data regarding same is eventually read by TLA 410, but non-binding suggestion 411 generated by TLA 410 and provided to UI controller 430 may or may not be processed right away. Thus, a resulting alert 2217 may be presented at a later time. Declarative constraint 2221 analysis and resulting alerts 2217 can also be a result of a separate process, e.g., in response to a user request.

Constraint engine 2216 can also implement, or non-binding suggestion 411 may also provide an option for, different limitations that are in effect while the electronic tax return includes an error as determined by the declarative constraint analysis. The limitation that is implemented may depend in part upon, for example, the type of tax return data 442 involved or the number of declarative constraints 2221 involved.

For example, in the event of any errors following evaluation of declarative constraints 2221, the user can be alerted immediately after the user has entered a value (e.g., when a constraint engine 2216 is used with UI controller 430), and the user is not permitted to continue to another field, interview screen or form until the errors are resolved with updated or corrected tax return data 442 that satisfies declarative constraints 211, such that the alert 2217 is retracted or no longer applicable. In other embodiments, appropriate declarative constraints 2221 are evaluated immediately after the user has entered a value, and the user is notified of any errors, but is permitted to proceed without making any corrections. These errors are eventually resolved, e.g., during a separate process or error check or as additional data 442 is received or updated and corrected during preparation of the electronic tax return.

While certain embodiments have been described with reference to predicting tax data to identify a possible error by use of prediction models, and identifying actual errors based at least in part upon evaluation of a declarative constraint, which may be a component of a completion graph, calculation graph, or other declarative data structure, embodiments may involve use of both predictive models and declarative constraints to provide a multi-faceted, real time error checking capabilities.

Figure 26:
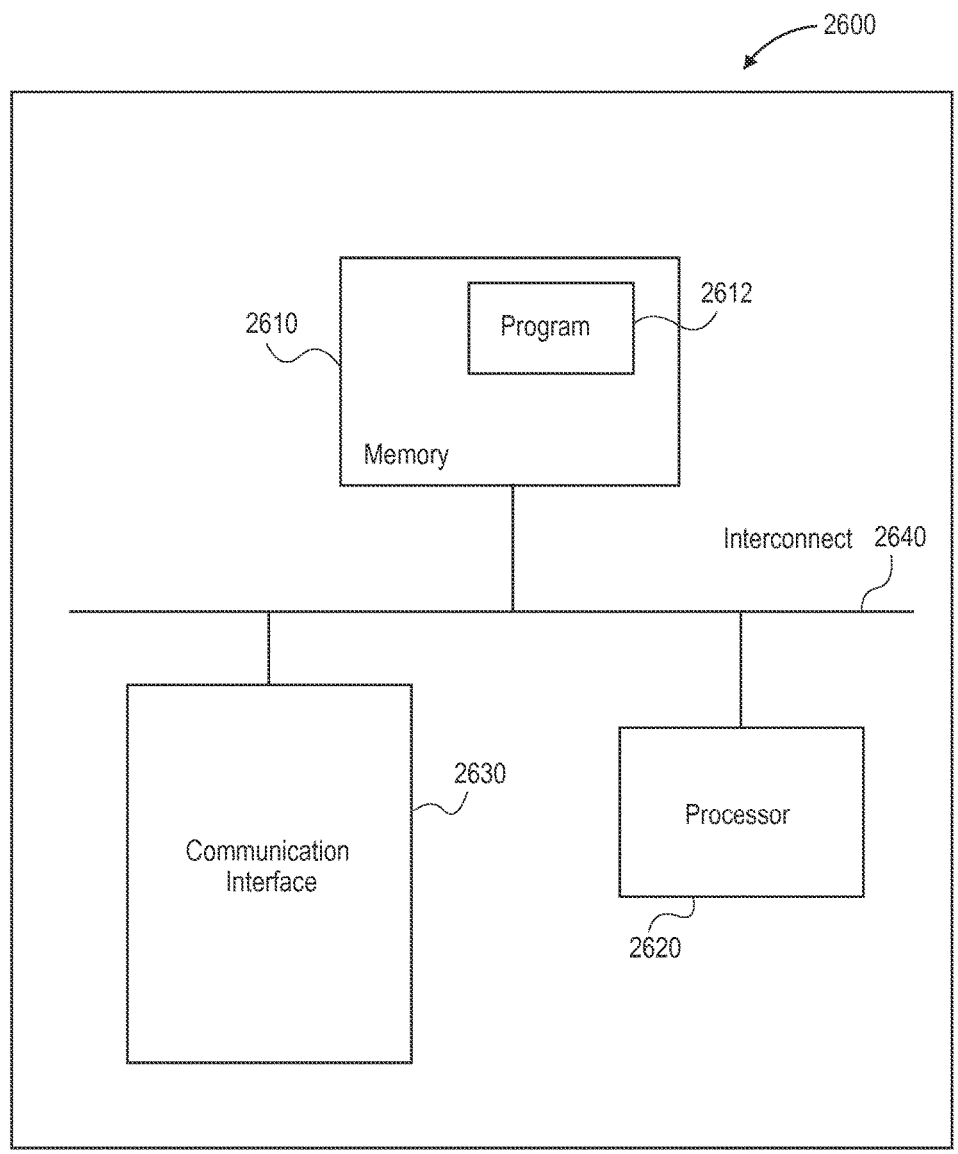
FIG. 26 is a block diagram of components of a computer system that may be programmed or configured to execute embodiments.

FIG. 26 generally illustrates certain components of a computing device 2600 that may be utilized to execute or that may embody components of embodiments. For example, the computing device may include a memory 2610, program instructions 2612, a processor or controller 2620 to execute instructions 2612, a network or communications interface 2630, e.g., for communications with a network or interconnect 2640 between such components. The memory 2610 may be or include one or more of cache, RAM, ROM, SRAM, DRAM, RDRAM, EEPROM and other types of volatile or non-volatile memory capable of storing data. The processor unit 2620 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2640 may include a system bus, LDT, PCI, ISA, or other types of buses, and the communications or network interface may, for example, be an Ethernet interface, a Frame Relay interface, or other interface. The network interface 2630 may be configured to enable a system component to communicate with other system components across a network which may be a wireless or various other networks. It should be noted that one or more components of computing device 2600 may be located remotely and accessed via a network. Accordingly, the system configuration provided in FIG. 26 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2620 performs steps or executes program instructions 2612 within memory 2610 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments have been described with reference to simplified predictive model examples, predictive models can be substantially more complex such that predictive models, and combinations thereof, can be utilized across different types of tax data. For example, a simple example of a predictive model may involve if mortgage >0 then property tax should be >0) or predictive models may involve more complex relationships, e.g., clustering tax returns based on zip code, wages, age using K-means, identifying which cluster a user belongs to, then determining if the user's property tax deduction is within a certain number of standard deviations of the mean for that cluster, and with further complexity. These predictive model capabilities are not available in known tax return preparation applications.

Moreover, while embodiments have been described with reference to data that has been entered into a field, e.g., by the user, predictive models may also be utilized to analyze data that is calculated or derived from other data. For example, in embodiments implemented in systems in which tax logic is separated from the user interface or interview process, when a user enters a certain number in a field through an interview screen generated by the UI controller as shown in FIG. 4, the UI controller writes the data to the shared data store, and the calculation engine reads data from the shared data store, performs a calculation to derive or determine other or new data, or update other data already entered into fields, and writes back the updated or new data to the shared data store. This data is then read by the TLA. Thus, the data read by the TLA, and which is processed using predictive models, may include a combination of data entered by the user (as well as data imported from an electronic source) and data determined or derived from a calculation.

Moreover, while certain embodiments involving predictive models to analyze electronic tax return data, and checking tax data according to constraints of tax laws expressed in a declarative manner, e.g., in the form of or based on data of a completion and/or calculation graph or using declarative constraints created and stored in a separate data store or library, embodiments may also be used together or concurrently.

Further, while the specification refers to certain predictive models that may be executed for use in embodiments, predictive models that can be utilized in embodiments can be created in various ways including, for example, using extrema values (min and max) on related tax returns, error ranges (range of uncertainty) for curves fitted to data in tax returns, clusters of similar users using naïve bayes, K-means clustering or other clustering techniques, a k-nearest neighbor algorithm, neural networks and logistic regression, and combinations of two or more of the aforementioned or other types of predictive models.

Further, a preparer can be alerted regarding a result of executing a predictive model. For example, predictive models can be executed at various times (for example, when the user enters a value for a field), the system will compare values in the user's tax return with predicted data or ranges of the predictive model output, and if the system finds that the value for a particular field is out of the range predicted for that field, then the system may flag that field to alert the user to review the tax data. The alert may occur immediately after the user has entered a suspicious value or at some later time, e.g., in response to a user request for error check using predictive models. As the system obtains more information about the user (either because the user has entered the information or because the system has obtained the information from another source on behalf of the user), that information is added to the collection of known facts about the user, and this may be used to re-evaluate or re-execute the predictive model such that an alert for particular tax data is generated after the data was entered, and in response to new tax data that was entered and resulted in execution of a predictive model again or another predictive model. For example, a predictive model can be evaluated whenever new information is available about the user. The results of the evaluation of the predictive model may be accessed whenever it is required, which may result in the latest available results of the predictive model not being based on all available information about the user depending on when the predictive model is accessed and executed.

A predictive model can be evaluated (to completion) before the user is allowed to take any further action, thus providing immediate feedback to the user.

Further, while certain embodiments have been described with reference to a system as illustrated in FIG. 4, in which a TLA generate non-binding suggestions for a UI controller, those two components being loosely coupled to each other such that tax logic is separated from the interview process (in contrast to various known tax return preparation applications), embodiments may also be implemented in traditional tax return preparation applications in which tax logic is hard coded within interview screens.

Moreover, while certain embodiments are described with reference to FIG. 4 and the TLA reading data from the shared data store, and the TLA executing or utilizing the predictive model based validation module, the predictive model based validation module may alternatively be, or may also be, utilized by the UI controller as data is received or inputted by the user or imported from an electronic source such as an electronic financial management system. When a result of execution of a predictive model indicates an alert, the UI controller may tag the data, write the tagged data to the shared data store, and when the TLA reads the shared data, the TLA identifies the tag and determines that the data was identified during the error check, which may be the basis for a subsequent non-binding suggestion generated by the TLA for the UI controller.

Additionally, while certain embodiments have been described with reference to predictive model input and data to be verified as both being data within fields of an electronic tax return that is being prepared, embodiments are not so limited. Other embodiments may involve utilizing at least one input from a source other than the electronic tax return that includes the field populated with data that is being verified, or use of at least one external input. For example, assuming a first predictive model, at least one input to the first predictive model is taxpayer-related data, which may be external data such as data of a prior year electronic tax return that was already filed, or other data that has been gathered or collected about the taxpayer, but not yet imported into the electronic tax return. Such data may include data collected from one or more external sources such as a financial management system utilized by the taxpayer (such as MINT or QUICKEN financial management systems), or from one or more other sources 450 shown in FIG. 4, such as an account the user has with an online social media website, third parties databases or resources (such as government databases or documents, such as property tax records, Department of Motor Vehicle (DMV) records) and other external sources. MINT and QUICKEN are registered trademarks of Intuit Inc., Mountain View, Calif.

External data may be used to start the predictive model validation process, or be utilized throughout the validation process. For example, after a field is populated with first tax data, and the TLA receives second tax data, embodiments may involve executing a predictive model with only the first tax data as an input, and then generating an output that is compared with the second tax data. In another embodiment, after a field is populated with first tax data, and the TLA receives second tax data, embodiments may involve executing a predictive model with the first tax data as an input and, in additional, one or more external data if available, and then generating an output that is compared with the second tax data. External data may be used as inputs into one or multiple predictive models that are executed simultaneously or in iterations as additional tax data is received.

According to one embodiment, external data is utilized as an input if or when it is available. According to another embodiment, external data is used to launch predictive model validation, e.g., when there is sufficient data in the electronic tax return fields such that a pre-determined minimum number of fields, or pre-determined types or specific fields have been populated, then external data is no longer utilized and instead, only data of the electronic tax return is utilized as inputs to a predictive model.

Further, while certain embodiments have been described with reference to verifying tax return data based on tax data predictions determined by execution of one or more predictive models, and other embodiments involving checking for actual errors relative to a constraint of a tax authority requirement expressed in a declarative manner, embodiments may utilized one of these embodiments or both of these embodiments at different times or simultaneously. For example, when a user requests performance of an error check, both predictive model execution and declarative constraint comparisons can be utilized.

Further, in embodiments involving declarative constraint analysis, constraints that are flagged as having an input value can be evaluated, and the flag removed after a current iteration of evaluation has been completed or an alert was generated, or the flags can be maintained, e.g., if the declarative constraint evaluations are performed at a later time (e.g., based on a subsequent action by the UI controller), such that when the constraint engine is called to execute, the constraint engine can identify the previously flagged constraints.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method, comprising:
a computerized tax return preparation system, comprising a tax return preparation software application stored in a data store of a computing device and executed by a processor of the computing device and operable to prepare an electronic tax return of a taxpayer, and a predictive model based validation module operable to analyze data of the electronic tax return, receiving first tax data and second tax data and populating respective first and second fields of the electronic tax return with respective first and second tax data, the tax return preparation software application having a modular architecture comprising a tax calculation engine, a completeness model comprising at least one decision table, a tax logic agent in communication with or comprising the predictive model based validation module, and a user interface management module loosely coupled to the tax logic agent;
the computerized tax return preparation system, by the predictive model based validation module, selecting a first predictive model associated with the first tax data and the second tax data;
the computerized tax return preparation system, by the predictive model based validation module, executing the first predictive model utilizing the first tax data as an input into the first predictive model, a first output being generated by execution of the first predictive model;
the computerized tax return preparation system, by the predictive model based validation module, comparing the first output generated by execution of the first predictive model and the second tax data;
the computerized tax return preparation system, by the tax return preparation software application, determining that the second tax data does not satisfy a pre-determined criterion relative to the first output generated by execution of the first predictive model;
the computerized tax return preparation system, by the tax logic agent, preparing a non-binding suggestion in response to determining, through the use of a corresponding declarative constraint, that the second tax data does not satisfy pre-determined criterion relative to the first output generated by execution of the first predictive model, and transmitting the non-binding suggestion to the user interface management module; and the computerized tax return preparation system, by the user interface management module, determining through the use of a configuration file whether to consider or ignore the non-binding suggestion and in response to determining to consider the non-binding suggestion, generating an alert identifying at least one of the second tax data and the second field, and presenting the alert to the taxpayer.

2. The computer-implemented method of claim 1, the alert being displayed to the taxpayer through the interview screen generated by the tax return preparation software application and identifying at least one of the second tax data and the second field.

3. The computer-implemented method of claim 1, the alert comprising an audible alert.

4. The computer-implemented method of claim 1, the alert identifying at least one unpopulated field of the electronic tax return associated with at least one of the first field and the second field.

5. The computer-implemented method of claim 1, the first predictive model being executed with the first tax data as the input into the first predictive model before the second tax data is received and entered into the second field.

6. The computer-implemented method of claim 1, the first predictive model being selected and executed in response to the second field being populated with the second tax data.

7. The computer-implemented method of claim 1, the first predictive model being selected and executed in response to a request by the taxpayer submitted through the tax return preparation software application.

8. The computer-implemented method of claim 1, further comprising the computerized tax return preparation system, by the first predictive model based validation module:
   comparing the first output generated by execution of the first predictive model generated by execution of the first predictive model and third tax data within a third field of the electronic tax return; and
   in response to determining that the third tax data does not satisfy a pre-determined criterion relative to the first output generated by execution of the first predictive model, the computerized tax return preparation system, by the tax return preparation application, presenting an alert to the taxpayer through an interview screen of the computerized tax return preparation system based on the first output generated by execution of the first predictive model, the alert identifying at least one of the third tax data and the third field.

9. The computer-implemented method of claim 1, further comprising the computerized tax return preparation system, by the predictive model based validation module:
   executing the first predictive model a second time utilizing the first tax data and the second tax data as inputs into the first predictive model, a second output being generated by execution of the first predictive model the second time;
   comparing the second output generated by executing the first predictive model and third tax data of a third field of the electronic tax return; and
   in response to determining that the third tax data does not satisfy a pre-determined criterion relative to the second output generated by executing the first predictive model, the computerized tax return preparation system, by the tax return preparation application, presenting an alert to the taxpayer through an interview screen of the computerized tax return preparation system based on the second output generated by executing the first predictive model, the alert identifying at least one of the third tax data and the third field.

10. The computer-implemented method of claim 1, further comprising the computerized tax return preparation system, by the predictive model based validation module:
   selecting a second predictive model different than the first predictive model, the second predictive model being associated with at least one of the first tax data, the second tax data and third tax data within a third field of the electronic tax return;
   executing the second predictive model utilizing at least one of the first tax data and the second tax data as inputs into the second predictive model, a second output being generated by execution of the second predictive model;
   comparing the second output generated by executing the second predictive model and the third tax data; and
   in response to determining that the third tax data does not satisfy a pre-determined criterion relative to the second output generated by executing the second predictive model, the computerized tax return preparation system, by the tax logic agent, preparing a second non-binding suggestion and transmitting the non-binding suggestion for generating an alert to the user interface management module.

11. The computer-implemented method of claim 1, further comprising the computerized tax return preparation system, by the predictive model based validation module:
   after executing the first predictive model a first time with the first tax data as the input, executing the first predictive model a second time with inputs comprising the first tax data and the third tax data, a second output being generated by execution of the first predictive model the second time;
   comparing the second output generated by executing the first predictive model and the second tax data; and
   in response to determining through the use of a second corresponding declarative constraint that the second tax data does not satisfy a pre-determined criterion relative to the second output generated by executing the first predictive model, the computerized tax return preparation system, by the tax logic agent, preparing a second non-binding suggestion and transmitting the non-binding suggestion for generating an alert to the user interface management module.

12. The computer-implemented method of claim 11, wherein the second tax data satisfied the first pre-determined criteria relative to the first output generated when the first predictive model was executed the first time with the first tax data as the input such that no alert was generated, and the second tax data failed to satisfy the second pre-determined criteria relative to the second output generated when the first predictive model was executed the second time with the first tax data and the third tax data as inputs, wherein the alert is generated following execution of the first predictive model the second time.

13. The computer-implemented method of claim 11, wherein the second tax data failed to satisfy the first pre-determined criteria relative to the first output generated when the first predictive model was executed the first time with the first tax data as the input such that the alert was generated, and the second tax data satisfied the second pre-determined criteria relative to the second output generated when the first predictive model was executed the second time with the first tax data and the third tax data as inputs, further comprising retracting the previously generated alert following execution of the first predictive model the second time.

14. The computer-implemented method of claim 1, further comprising the computerized tax return preparation system, by the predictive model based validation module, executing a second predictive model different than the first predictive model utilizing the first tax data as an input into the second predictive model, a second output being generated by execution of the second predictive model.

15. The computer-implemented method of claim 14, further comprising the computerized tax return preparation system, by the predictive model based validation module, determining a composite predictive model output based at least in part upon the first output generated by executing the first predictive model and the second output generated by executing the second predictive model, wherein the second tax data and the composite predictive model output are compared to determine whether to generate an alert.

16. The computer-implemented method of claim 15, the composite predictive model output comprising an average of a value of the first output generated by executing the first predictive model and a value of the second output generated by executing the second predictive model.

17. The computer-implemented method of claim 16, the composite predictive model output comprising a weighted average of the first output generated by executing the first predictive model and the second output generated by executing the second predictive model.

18. The computer-implemented method of claim 14, further comprising the computerized tax return preparation system, by the tax return preparation software application, generating an alert that is presented to the taxpayer to indicate that the taxpayer should check the second tax data in the second field when
the first output generated by executing the first predictive model does not satisfy the first pre-determined criteria relative to the first output, or
the second output generated by executing the second predictive model does not satisfy the second pre-determined criteria relative to the second output.

19. The computer-implemented method of claim 14, further comprising the computerized tax return preparation system, by the tax return preparation software application, generating an alert that is displayed to the taxpayer to indicate that the taxpayer should check the second tax data in the second field when
the first output generated by executing the first predictive model does not satisfy the first pre-determined criteria relative to the first output, and
the second output generated by executing the second predictive model does not satisfy the second pre-determined criteria.

20. The computer-implemented method of claim 1, the first output comprising a range of numeric values, the computerized tax return preparation system comparing a numeric value of the second tax data and the range of numeric values of the first output generated by executing the first predictive model.

21. The computer-implemented method of claim 1, the first output generated by executing the first predictive model comprising a binary response option, wherein the computerized tax return preparation system determines whether the second tax data matches the binary response option of the first output generated by executing the first predictive model.

22. The computer-implemented method of claim 1, further comprising the computerized tax return preparation system, by the predictive model based validation module:
accessing a collection of predictive models; and
selecting the first predictive model from the collection of predictive models for execution based at least in part upon the first tax data.

23. The computer-implemented method of claim 22, further comprising the computerized tax return preparation system, by the predictive model based validation module:
accessing the collection of predictive models;
selecting a second predictive model different than the first predictive model based at least in part upon a combination of the first tax data and third tax data in a third field of the electronic tax return; and
executing the second predictive model utilizing the first tax data and the second tax data as inputs into the second predictive model, execution of the second predictive model generating a second output that is compared with the second tax data.

24. The computer-implemented method of claim 1, the first predictive model executing on multiple inputs and generating the first output indicating whether the second tax data satisfies first pre-determined criteria.

25. The computer-implemented method of claim 24, all of the inputs comprising respective data from respective fields of the electronic tax return.

26. The computer-implemented method of claim 24, at least one input to the first predictive model comprising data of an electronic data source other than the electronic tax return.

27. The computer-implemented method of claim 1, at least one input to the first predictive model comprising data of a field of the electronic tax return and data of an electronic data source other than the electronic tax return.

28. The computer-implemented method of claim 1, wherein the first predictive model is an algorithm created using a modeling technique selected from the group consisting of logistic regression, naive bayes, K-means clustering, clustering, k-nearest neighbor, or neural networks.

29. The computer-implemented method of claim 1, further comprising the computerized tax return preparation system, by the predictive model based validation module, creating the predictive model.

30. The computer-implemented method of claim 1, the predictive model being created based on tax data of electronic tax returns of prior tax years.

31. The computer-implemented method of claim 1, the tax return preparation software program comprising a rule engine, the rule engine and the user interface management module being in communication with a shared data store,
the rule engine reading, from the shared data store, current electronic tax return data comprising the first tax data and the second tax data and data of any alert, executing rules defined by the decision table using the electronic tax return data, wherein the decision table includes a plurality of rows defining respective rules and a plurality of columns defining respective questions, generating one or more additional non-binding suggestions of a topic or question that may be presented to the taxpayer, and transmitting the one or more additional nonbinding suggestions to the user interface management module; and
the user interface management module receiving the one or more additional non-binding suggestions, determining one or more output tax questions to present to a user based at least in part on the the one or more additional non-binding suggestions, generating or selecting an interview screen comprising one or more output tax questions, and receiving an answer to the one or more output questions from the taxpayer through the interview screen; and the user interface management module writing the answer to the shared data store to update the current electronic tax return data.

32. The computer-implemented method of claim 31, wherein the predictive model based validation module is a component of or in communication with the rule engine, the predictive model based validation module executing at least one predictive model as new tax data is received and, the rule engine outputting updated non-binding suggestions of a tax topic or question to the user interface management module based on executing respective predictive model outputs.

33. A computer-implemented method, comprising:
a computerized tax return preparation system, comprising a tax return preparation software application stored in a data store of a computing device and executed by a processor of the computing device and operable to prepare an electronic tax return of a taxpayer, and a predictive model based validation module operable to analyze data of the electronic tax return, receive taxpayer-related data and tax data and populate a field of the electronic tax return with the tax data, the tax return preparation software application having a modular architecture comprising a tax calculation engine, a completeness model comprising at least one decision table, a tax logic agent in communication with or comprising the predictive model based validation module, and a user interface management module loosely coupled to the tax logic agent;

the computerized tax return preparation system being configured to select, by the predictive model based validation module, a first predictive model associated with the taxpayer-related data, wherein the selected predictive model is an algorithm created using a modeling technique selected from the group consisting of logistic regression, naive bayes, K-means clustering, clustering, k-nearest neighbor, or neural networks;

the computerized tax return preparation system being configured to execute, by the predictive model based validation module, the predictive model in response to the field being populated with the tax data and utilizing the taxpayer related data as an input into the predictive model, an output being generated by execution of the predictive model;

the computerized tax return preparation system being configured to compare, by the predictive model based validation module, the first output generated by executing the predictive model and the first tax data;

the computerized tax return preparation system being configured to determine, by the tax return preparation software application, that the first tax data does not satisfy a pre-determined criterion relative to the output generated by executing the predictive model;

the computerized tax return preparation system being configured to prepare, by the tax logic agent, a non-binding suggestion in response to determining, through the use of a corresponding declarative constraint, that the second tax data does not satisfy pre-determined criterion relative to the output generated by executing the predictive model, and transmitting the non-binding suggestion to the user interface management module; and the computerized tax return preparation system being configured to, by the user interface management module, determine through the use of a configuration file whether to consider or ignore the non-binding suggestion and in response to determining to consider the non-binding suggestion, generating an alert identifying at least one of the first tax data and the first field, and presenting the alert to the taxpayer.

34. The computer-implemented method of claim 33, wherein the taxpayer related data is received from an electronic data source other than an electronic tax return of the taxpayer.

35. The computer-implemented method of claim 33, wherein the taxpayer related data is received from an electronic tax return of the taxpayer from a prior tax year.

* * * * *